(12) United States Patent
Matsutani

(10) Patent No.: US 7,808,539 B2
(45) Date of Patent: Oct. 5, 2010

(54) IMAGE PROCESSOR THAT CONTROLS TRANSFER OF PIXEL SIGNALS BETWEEN AN IMAGE SENSOR AND A MEMORY

(75) Inventor: Takashi Matsutani, Osaka (JP)

(73) Assignee: MegaChips Corporation, Osaka-shi (JP)

(*) Notice: Subject to any disclaimer, the term of this patent is extended or adjusted under 35 U.S.C. 154(b) by 726 days.

(21) Appl. No.: 11/609,504

(22) Filed: Dec. 12, 2006

(65) Prior Publication Data

US 2007/0146515 A1 Jun. 28, 2007

(30) Foreign Application Priority Data

Dec. 26, 2005 (JP) ............................. 2005-371818

(51) Int. Cl.
*H04N 3/14* (2006.01)
*H04N 5/335* (2006.01)

(52) U.S. Cl. ...................................... 348/316; 348/323

(58) Field of Classification Search .................. 348/316, 348/321, 323

See application file for complete search history.

(56) References Cited

U.S. PATENT DOCUMENTS

| 4,539,596 | A | * | 9/1985 | Elabd | 348/316 |
|---|---|---|---|---|---|
| 4,821,103 | A | * | 4/1989 | Busby | 348/298 |
| 6,091,851 | A | * | 7/2000 | Acharya | 382/167 |
| 6,160,580 | A | * | 12/2000 | Nakashiba | 348/320 |
| 6,731,338 | B1 | * | 5/2004 | Lin | 348/323 |
| 7,236,199 | B2 | * | 6/2007 | Hori et al. | 348/321 |

FOREIGN PATENT DOCUMENTS

| JP | 04284582 A | * 10/1992 |
|---|---|---|
| JP | 2004-180059 | 6/2004 |

* cited by examiner

*Primary Examiner*—John M Villecco
(74) *Attorney, Agent, or Firm*—Oblon, Spivak, McClelland, Maier & Neustadt, L.L.P.

(57) ABSTRACT

Pixel signals are sequentially output from an image sensor in a reverse order to an order in which light sensing cells are arranged with respect to one of a horizontal direction and a vertical direction. In an image processor, first, a data reading part transfers the pixel signals in the same order as corresponding light sensing cells are arranged with respect to both of a horizontal direction and a vertical direction, and a signal sequence of the pixel signals is changed. Then, the pixel signals which are output group by group are sequentially selected by a selector in accordance with a sequence of groups. As a result, the pixel signals can be supplied from the selector in an order conforming a two-dimensional array of the light sensing cells, to thereby facilitate color interpolation which is to be later performed by a color interpolator.

18 Claims, 17 Drawing Sheets

FIG. 4
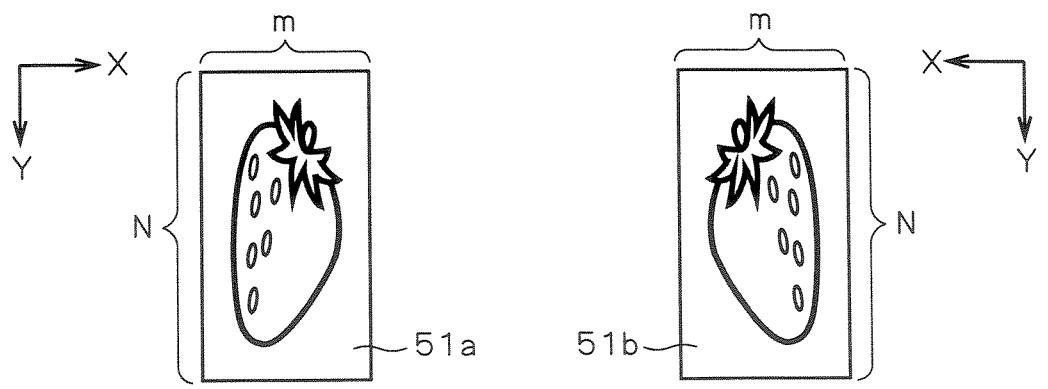
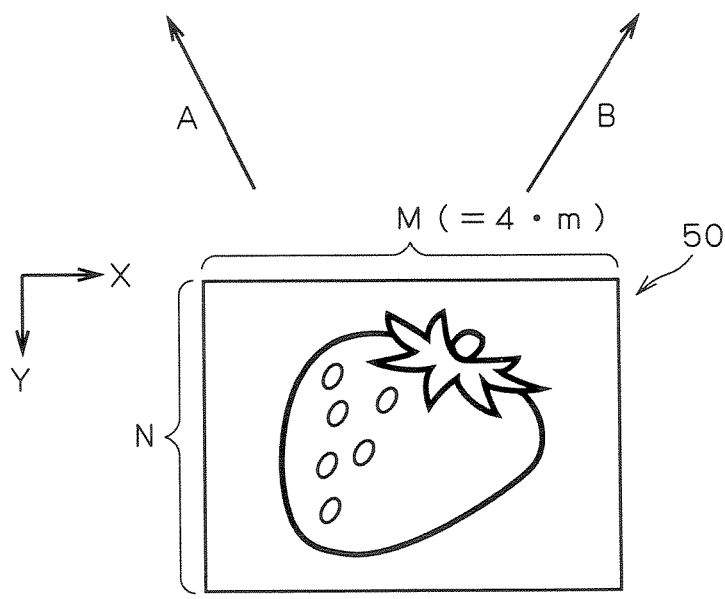
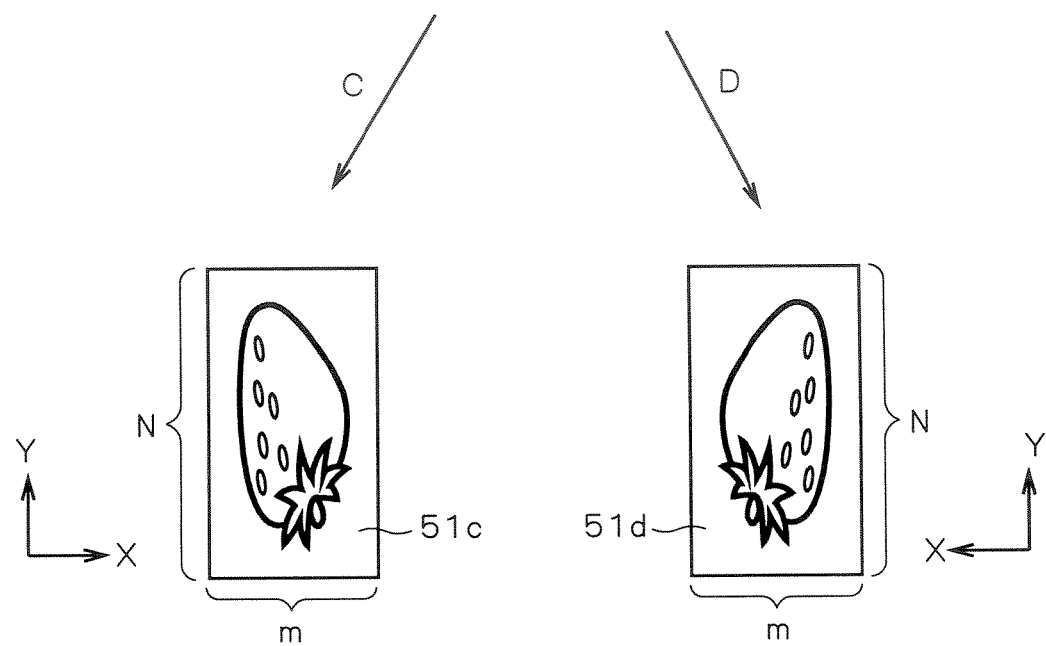

F I G . 8
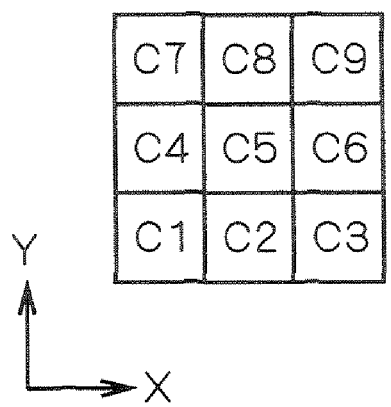
F I G . 9
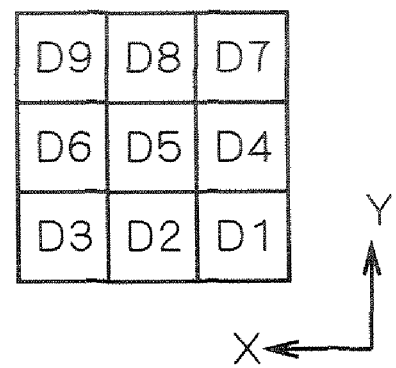

F I G . 1 3
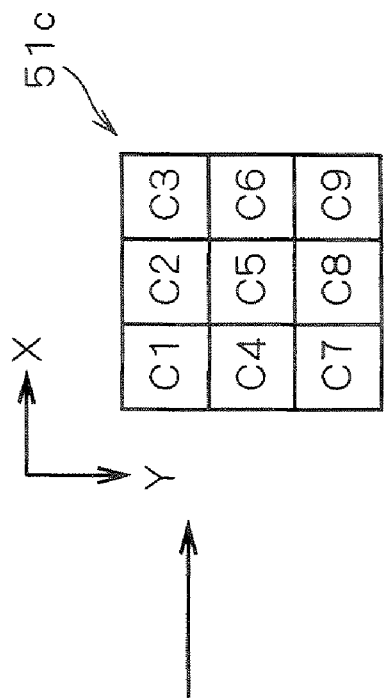
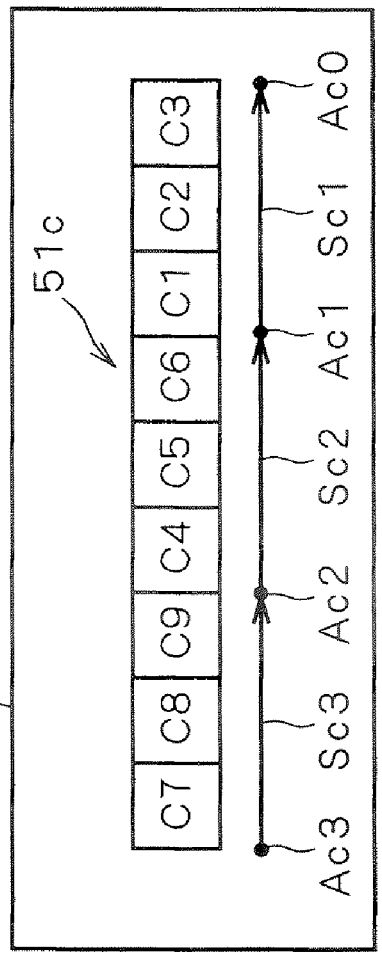

IMAGE PROCESSOR THAT CONTROLS TRANSFER OF PIXEL SIGNALS BETWEEN AN IMAGE SENSOR AND A MEMORY

BACKGROUND OF THE INVENTION

1. Field of the Invention

The present invention relates to an image processor for processing an image output from an image sensor.

2. Description of the Background Art

In a digital still camera capable of capturing a color image, typically each of a plurality of light sensing cells (light sensing pixels) included in an image sensor is provided with only one of filters respectively adapted to generate color components of red (R), green (G), and blue (B), for example. Accordingly, one pixel signal indicating a value of only one out of the color components of R, G, and B is obtained in each of the light sensing cells. For this reason, interpolation is carried out based on other pixel signals surrounding each of the pixel signal, to achieve color interpolation in which respective values of missing color components are generated. Then, an image formed of pixel signals each of which has respective values of all the color components of R, G, and B can be obtained (refer to Japanese Patent Application Laid-Open No. 2004-180059, for example).

In the meantime, in recent years, a time period required for completing output of all pixel signals has increased because of an increase in the number of pixels (cells) included in an image sensor. Thus, there is a demand for a significant reduction in a time period taken to output all pixel signals. In an effort to satisfy this demand, an image sensor in which light sensing cells are classified into a plurality of groups has been suggested. In this suggested image sensor, respective sets of pixel signals caused by the plurality of groups each including some of the light sensing cells are read out in parallel, and the pixel signals as read out are output as partial images. Alternatively, in another suggested image sensor of a similar type in which light sensing cells are classified into a plurality of groups, pixel signals are output in a reverse order to an order in which the light sensing cells are either horizontally or vertically arranged in a two-dimensional array of the light sensing cells.

A plurality of partial images which are respectively caused by the plurality of groups and output from the image sensor need to be finally combined into a single image. In particular, in order to achieve the above-mentioned color interpolation, other pixel signals surrounding each of pixel signals are necessary. For this reason, there is a need of creating an image formed of pixel signals which are obtained in the same order as light sensing cells respectively corresponding to the pixel signals are arranged, prior to carry out color interpolation.

SUMMARY OF THE INVENTION

The present invention is directed to an image processor for controlling transfer of pixel signals between an image sensor and a memory storing the pixel signals in association with respective addresses.

According to the present invention, the image sensor includes a plurality of light sensing cells each belonging to any of a plurality of groups, which are arranged in a two-dimensional array defined by a first direction and a second direction, and the image sensor outputs the pixel signals which are obtained in the plurality of light sensing cells and are collected in plural sets respectively for the plurality of groups. Some of the pixel signals obtained in some of the plurality of light sensing cells which belong to one of the plurality of groups are sequentially output in a reverse order to an order in which some of the plurality of light sensing cells are arranged in the two-dimensional array with respect to at least one of the first direction and the second direction. The image processor includes: a transfer part for sequentially transferring the pixel signals which are collected in plural sets respectively for said plurality of groups and supplied from the plurality of light sensing cells in an order in which corresponding light sensing cells are arranged in either the first direction and the second direction of the two-dimensional array while manipulating the respective addresses; and a selector for sequentially selecting and outputting the pixel signals according to a sequence of the plurality of groups in the two-dimensional array.

In a case where some of the pixel signals supplied from some of the light sensing cells which belong to one of the groups are output in a reverse order to an order in which some of the light sensing cells are arranged in the two-dimensional array with respect to at least one of the first direction and the second direction, some of the pixel signals are transferred by the transfer part in the same order as some of the light sensing cells are arranged in the two-dimensional array with respect to the first direction and the second direction. Then, the pixel signals which are output while being collected in plural sets respective for the groups are selected by the selector according to a sequence of the groups. Accordingly, it is possible to obtain the pixel signals from the selector in the same order as corresponding light sensing cells are arranged in the two-dimensional array, to thereby facilitate later image processing.

According to one aspect of the present invention, some of the plurality of light sensing cells which belong to a half of the plurality of groups are placed in one of two arbitrary horizontal lines laid adjacent to each other, and the others of the plurality of light sensing cells which belong to the other half of the plurality of groups are placed in the other of the two arbitrary horizontal lines, in the image sensor. The transfer part includes channel units, of which number is equal to a half of the number of the plurality of groups, and two sets of pixel signals which are respectively caused by two groups are alternately transferred from one horizontal line to another horizontal line by each of the channel units.

Each of the channel units is used for transfer of pixel signals caused by two groups, so that the number of channel units provided in the transfer part can be reduced.

Therefore, it is an object of the present invention to provide an image processor which is capable of obtaining pixel signals in the same order as light sensing cells are arranged in a two-dimensional array, to facilitate later image processing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 schematically illustrates orders in which pixel signals included in partial images are arranged.

FIG. 8 illustrates a model of a partial image caused by C group.

FIG. 9 illustrates a model of a partial image caused by D group.

FIG. 13 explains a method for reading out the partial image caused by C group.

DESCRIPTION OF THE PREFERRED EMBODIMENTS

Below, a digital still camera which is an apparatus for capturing an image ("image capture apparatus") will be described as an example of an apparatus to which an image processor according to a preferred embodiment of the present invention is applied.

1. Overview of Digital Still Camera

Figure 1:
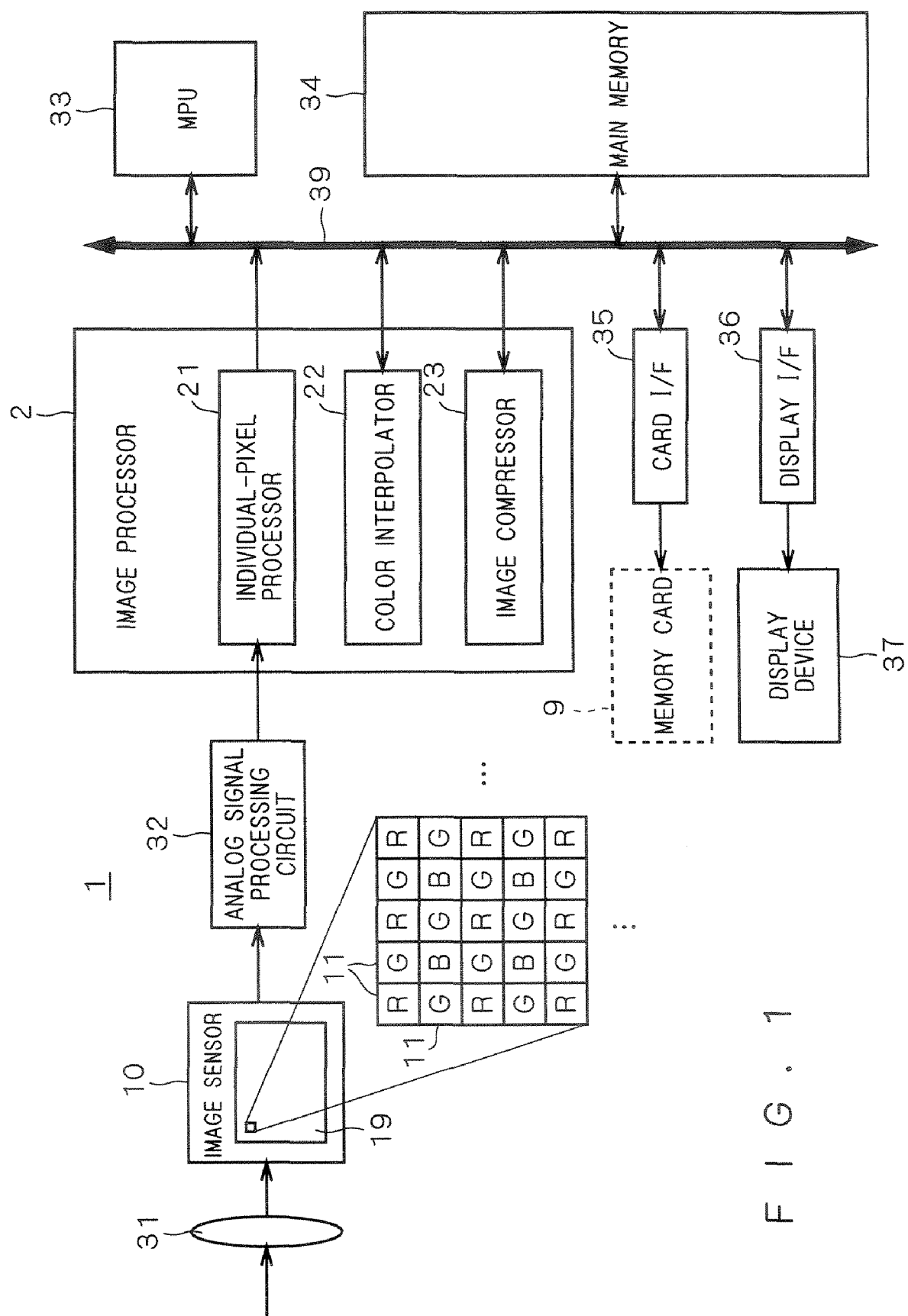
FIG. 1 is a block diagram roughly illustrating a structure of a digital still camera.

FIG. 1 is a block diagram roughly illustrating a structure of a digital still camera 1. The digital still camera 1 functions to photograph a subject to capture a digital image of the subject, and to record the captured digital image on a memory card 9 which is a transportable recording medium.

As illustrated in FIG. 1, the digital still camera 1 includes an optical system 31, an image sensor 10, and an analog signal processing circuit 32 which form an image capturing part for capturing an image.

The optical system 31 forms an image using incident light, to produce an optical image of a subject on a light sensor 19 of the image sensor 10. The image sensor 10 includes a CCD sensor, and the light sensor 19 of the image sensor 10 includes a plurality of light sensing cells (light sensing pixels) 11 which are arranged in two dimensions. In each of the plurality of light sensing cells 11 which includes a photodiode, photo-electric conversion is performed so that an electric charge with a magnitude which is proportional to an amount of sensed light is obtained as a pixel signal. The optical image produced on the light sensor 19 is converted into an analog image by the plurality of light sensing cells 11, and then the analog image is output from the image sensor 10.

In each of the plurality of the light sensing cells 11, a filter adapted to generate any of color components of R, G, and B is provided, so that a pixel signal indicating a value of only one of the three color components which can be generated by the provided filter is obtained. As illustrated in FIG. 1, the filters for the color components of R, G, and B are arranged in Bayer pattern. Further, the image sensor 10 is configured to divide a single image which is captured by a single exposure process into four partial images in outputting the single image for the purpose of reducing a time period taken to output the single image. Details of the way to reduce a time period will be given at later paragraphs.

The analog signal processing circuit 32 performs various processes such as removal of a noise and adjustment of a signal level on an analog image output from the image sensor 10. Also, the analog signal processing circuit 32 has a A/D conversion function, and converts a magnitude of each of pixel signals into a digital value. Thus, an analog image is converted into a digital image.

The digital still camera 1 further includes an image processor 2 for processing a digital image which is obtained in the foregoing manner, and a main memory 34 which stores a digital image.

The image processor 2 is formed of an LSI including various functional circuits for processing an image which are integrated on a single chip. An individual-pixel processor 21, a color interpolator 22, and an image compressor 23 which are illustrated in FIG. 1 indicate principle image-processing functions of the image processor 2.

The individual-pixel processor 21 which processes an image by processing pixel signals forming the image one by one. The individual-pixel processor 21 is used for shading correction and the like of an image. The color interpolator 22 carries out color interpolation so that each of pixel signals forming an image has three color components of R, G, and B. More specifically, the color interpolator 22 generates a value of a missing color component for each of pixel signals forming an image by carrying out interpolation based on respective values of surrounding pixel signals. The image compressor 23 compresses an image to convert the format of the image into JPEG format or the like, to thereby reduce an amount of data of the image.

The main memory 34 includes a DRAM, on which each of pixel signals of an image which has been processed by the image processor 2 is recorded in association with an address. Transfer of an image between the image processor 2 and the main memory 34 is achieved using a bus 39.

Moreover, the digital still camera 1 includes an MPU 33 for controlling the digital still camera 1 as a whole, a display device 37 such as an LCD for displaying various pieces of information, a card I/F 35 for recording an image on the memory card 9 and reading out an image from the memory card 9, and a display I/F 36 for causing the display device 37 to display an image. Also the MPU 33, the card I/F 35, and the display I/F 36 are connected to the bus 39, so that each of the MPU 33, the card I/F 35, and the display I/F 36 can handle an image and the like recorded on the main memory 34. Furthermore, the digital still camera 1 includes operating members, such as a shutter button and a setting button, which are supposed to be included in a typical digital still camera, although those operating members are not illustrated in the drawings.

Figure 2:
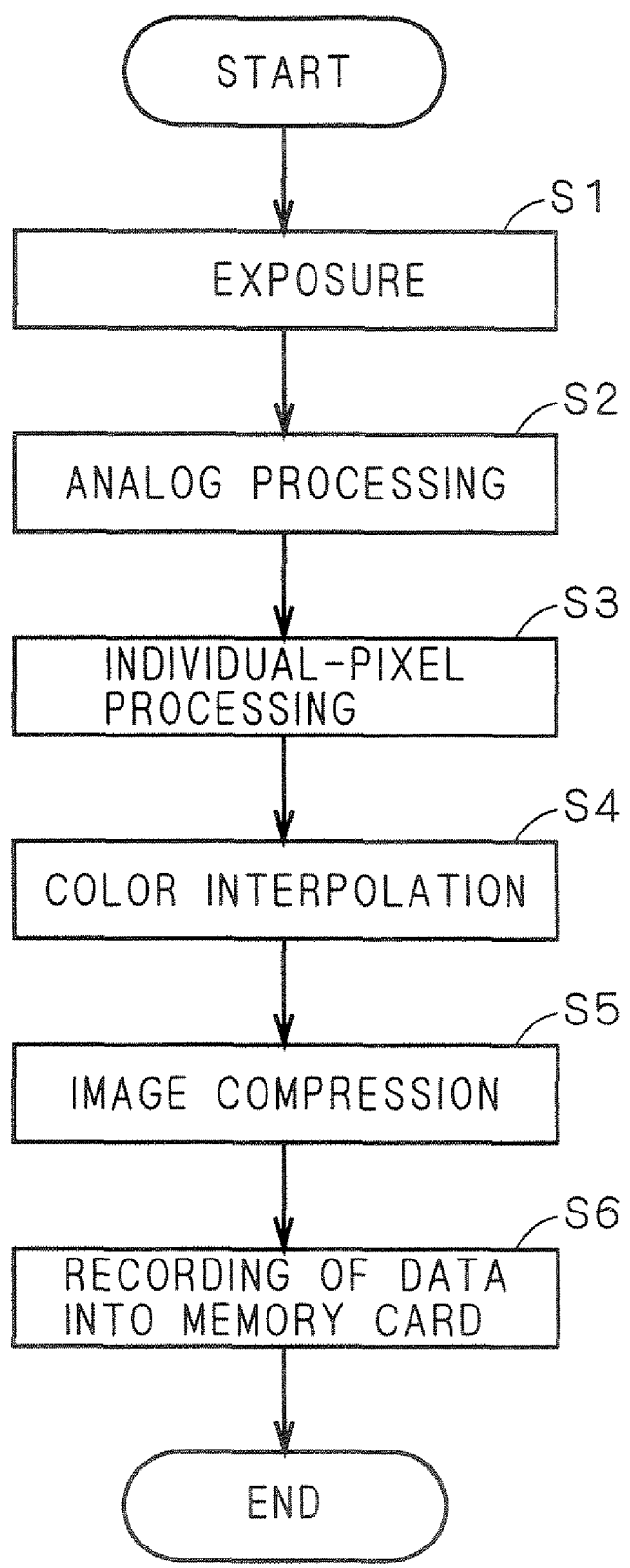
FIG. 2 is a flow chart showing operations of the digital still camera in photographing.

Now, operations of the digital still camera 1 will be briefly described. FIG. 2 is a flow chart showing operations of the digital still camera 1 in photographing. The digital still camera 1 starts to perform the operations in the flow chart in response to a user's press of the shutter button.

First, an exposure process is performed in the image sensor 10 (step S1), and then, the image sensor 10 outputs an analog image. The analog image output from the image sensor 10 is processed in a predetermined manner by the analog signal processing circuit 32, to be converted into a digital image, which is then output to the image processor 2 (step S2).

Subsequently, the image output from the analog signal processing circuit 32 is input directly to the individual-pixel processor 21 of the image processor 2. Then, the individual-pixel processor 21 performs shading correction and the like on the image, and thereafter, the image is written into the main memory 34 via the bus 39 (step S3).

After the image is once written into the main memory 34, the image is read out from the main memory 34 via the bus 39 and input to the color interpolator 22. The color interpolator 22 carries out color interpolation on the image, and the image which has been processed by the color interpolator 22 is again written into the main memory 34 via the bus 39 (step S4).

After that, the image is read out from the main memory 34 via the bus 39 and input to the image compressor 23. The image compressor 23 compresses the image, and the compressed image is written into the main memory 34 via the bus 39 (step S5).

Then, the image processed by the image processor 2 in the foregoing manner should be in a recordable format, to be recorded on the memory card 9 via the card I/F 35 (step S6). The image recorded on the memory card 9 can be read out from the memory card 9 to be displayed on the display device 37 via the display I/F 36 as needed.

2. Image Sensor

As described above, the image sensor 10 divides a single image (entire image) obtained by a single exposure process into four partial images in outputting. The image sensor 10 functioning in the foregoing manner will be described in detail as follows.

Figure 3:
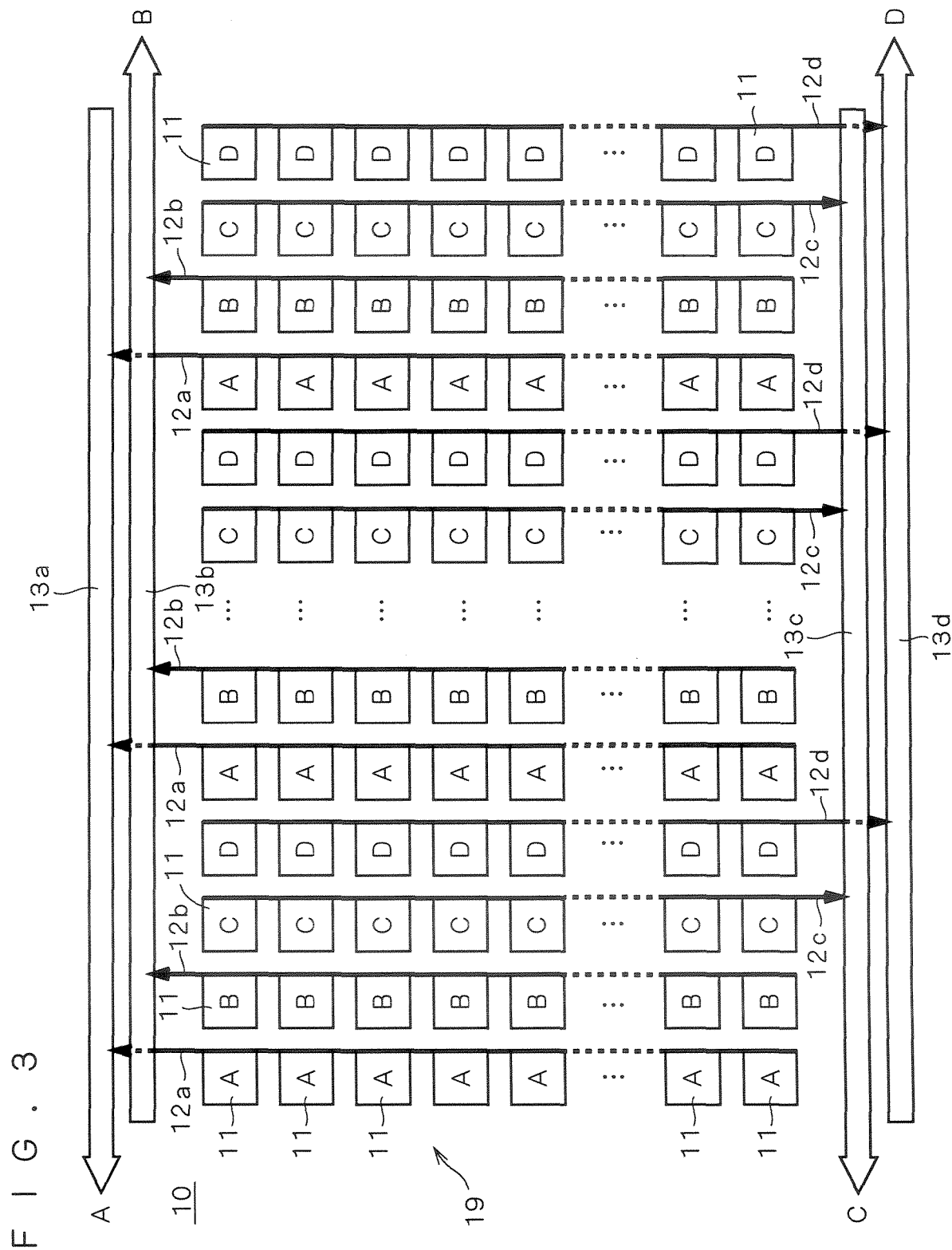
FIG. 3 illustrates one example of a structure of an image sensor.

FIG. 3 illustrates a structure of the image sensor 10. The plurality of light sensing cells 11 forming the light sensor 19 of the image sensor 10 are classified into four groups of A group, B group, C group, and D group. A character "A", "B", "C", or "D" in each of the light sensing cells 11 in FIG. 3 indicates which of the groups each of the light sensing cells 11 belongs to.

Now, draw attention to one horizontal line (a row of some of the light sensing cells 11 which are horizontally arranged). As illustrated in FIG. 3, the light sensing cells 11 are placed such that a series of four light sensing cells 11 which respectively belong to A group, B group, C group, and D group and are arranged in an order mentioned is repeatedly present from the left-hand side of FIG. 3. Accordingly, each quarter of the light sensing cells 11 included in the one horizontal line belong to the same group. On the other hand, in each of vertical lines in which some of the light sensing cells 11 are vertically arranged, only light sensing cells 11 belonging to the same group are placed. The image sensor 10 includes four output systems which independently operate for the four groups, respectively, so that respective sets of pixel signals caused by the four groups of the light sensing cells 11 can be output in parallel.

A first output system outputs pixel signals obtained in the light sensing cells 11 belonging to A group, and includes a vertical transfer part 12a and a horizontal transfer part 13a. The vertical transfer part 12a is placed along each of vertical lines which includes the light sensing cells 11 belonging to A group. The vertical transfer part 12a reads out pixel signals from the light sensing cells 11 belonging to A group and transfers the read pixel signals to the upper side of FIG. 3. Also, the horizontal transfer part 13a receives the pixel signals transferred from the vertical transfer part 12a, and further transfers the received pixel signals to the left-hand side of FIG. 3.

A second output system outputs pixel signals obtained in the light sensing cells 11 belonging to B group, and includes a vertical transfer part 12b and a horizontal transfer part 13b. The vertical transfer part 12b is placed along each of vertical lines which includes the light sensing cells 11 belonging to B group. The vertical transfer part 12b reads out pixel signals from the light sensing cells 11 belonging to B group and transfers the read pixel signals to the upper side of FIG. 3. Also, the horizontal transfer part 13b receives the pixel signals transferred from the vertical transfer part 12b, and further transfers the received pixel signals to the right-hand side of FIG. 3.

A third output system outputs pixel signals obtained in the light sensing cells 11 belonging to C group, and includes a vertical transfer part 12c and a horizontal transfer part 13c. The vertical transfer part 12c is placed along each of vertical lines which includes the light sensing cells 11 belonging to C group. The vertical transfer part 12c reads out pixel signals from the light sensing cells 11 belonging to C group and transfers the read pixel signals to the lower side of FIG. 3. Also, the horizontal transfer part 13c receives the pixel signals transferred from the vertical transfer part 12c, and further transfers the received pixel signals to the left-hand side of FIG. 3.

A fourth output system outputs pixel signals obtained in the light sensing cells 11 belonging to D group, and includes a vertical transfer part 12d and a horizontal transfer part 13d. The vertical transfer part 12d is placed along each of vertical lines which includes the light sensing cells 11 belonging to D group. The vertical transfer part 12d reads out pixel signals from the light sensing cells 11 belonging to D group and transfers the read pixel signals to the lower side of FIG. 3. Also, the horizontal transfer part 13d receives the pixel signals transferred from the vertical transfer part 12d, and further transfers the received pixel signals to the right-hand side of FIG. 3.

The four output systems are capable of transferring pixel signals independently of one another. Pixel signals output from each of the four output systems form a single partial image. Accordingly, four partial images respectively caused by the four groups are output from the image sensor 10 independently of one another.

Also, the four output systems are different in a transfer direction which is determined based on the array of the light sensing cells 11. Because of the differences in a transfer direction among the four output systems, each of three partial images out of the four partial images is formed of pixel signals which are output in a reverse order to at least one of an order in which corresponding light sensing cells 11 are horizontally arranged and an order in which corresponding light sensing cells 11 are vertically arranged.

FIG. 4 schematically illustrates partial images 51a, 51b, 51c, and 51d. Note that, in FIG. 4 and later, a horizontal direction of an image is indicated by an X direction and a vertical direction of an image is indicated by a Y direction. Each of the partial images 51a, 51b, 51c, and 51d illustrated in FIG. 4 is formed by arranging pixel signals in an order in which the pixel signals are output. According to the present preferred embodiment, it is assumed that representation of pixel signals as an image is achieved by sequentially arranging successive pixel signals from the uppermost horizontal line (a horizontal line is a row of pixel signals which are horizontally arranged) to the lowermost horizontal line while the pixel signals are arranged from the left to the right in each of the horizontal lines. More specifically, the pixel signals are sequentially arranged in an order which starts from the left to the right on the uppermost horizontal line, then proceeds from the left to the light on the second horizontal line placed directly under the uppermost horizontal line, further proceeds from the left to the right on the third horizontal line placed directly under the second horizontal line, and proceeds in the same way, to finally stop at the right on the lowermost horizontal line. In the present specification, an arrangement of pixel signals when the pixel signals form an image will be referred to simply as an "arrangement" of pixel signals. On the other hand, an order in which pixel signals are arranged when the pixel signals form a signal sequence will be referred to as a "signal sequence" of pixel signals.

An image illustrated in a central region in FIG. 4 is an entire image 50 formed by all the light sensing cells 11 included in the light sensor 19. Respective orders in which the light sensing cells 11 are horizontally and vertically arranged are directly reflected in respective orders in which corresponding pixel signals are horizontally and vertically arranged in the entire image 50. According to the present preferred embodiment, the light sensor 19 includes M×N matrix of the light sensing cells 11 (where M is the number of the light sensing cells 11 included in each horizontal line and is 2880, for example, and N is the number of the light sensing cells 11 included in each vertical line and is 2160, for example). Accordingly, the entire image 50 includes M×N matrix of pixel signals (where M is the number of pixel signals included in each horizontal line, and N is the number of pixel signals included in each vertical line). Further, each of the partial images 51a, 51b, 51c, and 51d includes m (m=M/4)×N matrix of pixel signals (where m is the number of pixel signals included in each horizontal line, and N is the number of pixel included in each vertical line), because each quarter of the light sensing cells 11 in each horizontal line belong to the same group as described above.

As illustrated in FIG. 4, the partial image 51a caused by A group includes pixel signals which are output in the same order as corresponding pixel signals in the entire image 50 are arranged. However, the partial image 51b caused by B group includes pixel signal which are output in a reverse order to an order in which corresponding pixel signals in the entire image 50 are arranged, with respect to a horizontal direction. Also, the partial image 51c caused by C group includes pixel signals which are output in a reverse order to an order in which corresponding pixel signals in the entire image 50 are arranged, with respect to a vertical direction. Further, the partial image 51d caused by D group includes pixel signal which are output in a reverse order to an order in which corresponding pixel signals in the entire image 50 are arranged, with respect to both a horizontal direction and a vertical direction.

Below, principles for the above-mentioned output of pixel signals will be explained with reference to models illustrated in FIG. 5. A model of the entire image 50 is illustrated in a central region in FIG. 5. The model of the entire image 50 in FIG. 5 includes 36 pixel signals of twelve pixel-signals wide by three pixel-signals high (12×3 matrix of pixel signals). Each of 36 pixel signals is identified by a reference numeral given thereto. More specifically, each of pixel signals caused by A group is denoted by Ak (k=1 to 9), each of pixel signals caused by B group is denoted by Bk (k=1 to 9), each of pixel signals caused by C group is denoted by Ck (k=1 to 9), and each of pixel signals caused by D group is denoted by Dk (k=1 to 9). The reference numeral "k" (k=1 to 9) increases in an order in which the pixel signals are arranged in each of the groups.

Figure 5:
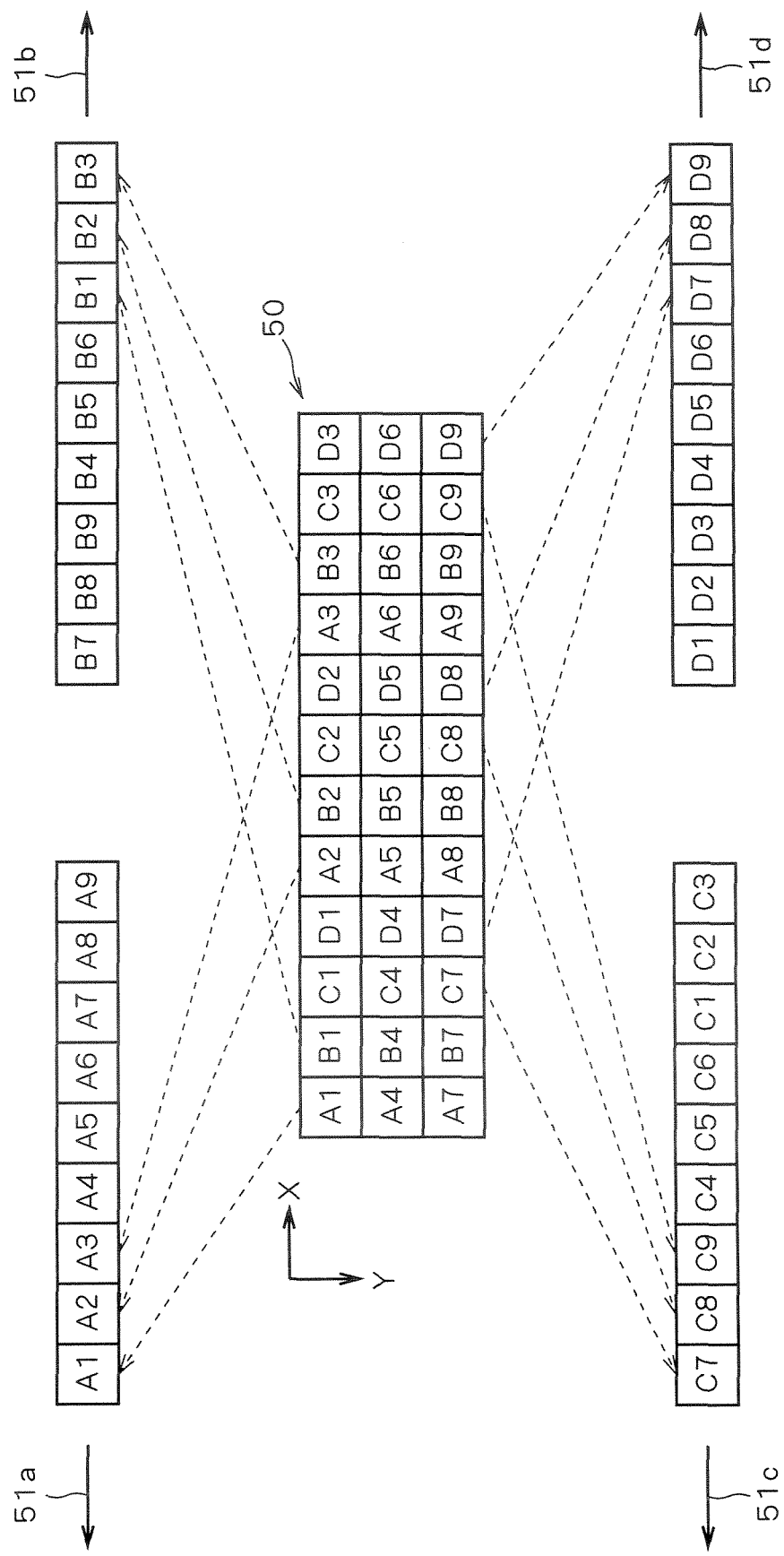
FIG. 5 illustrates a model of an entire image.
Figure 6:
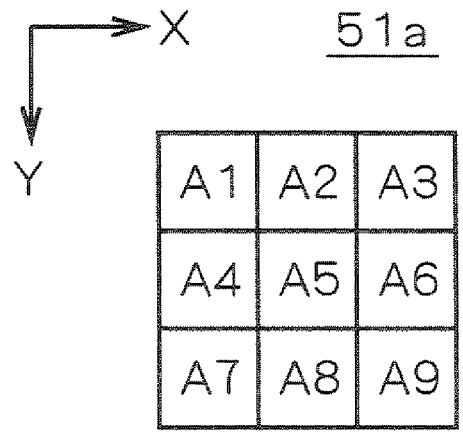
FIG. 6 illustrates a model of a partial image caused by A group.

As illustrated in FIG. 5, the pixel signals caused by A group are sequentially output in an "A1, A2, A3, A4, A5, A6, A7, A8, and A9" sequence, starting from a pixel signal placed in the upper left. The partial image 51a having the foregoing signal sequence is represented as illustrated in FIG. 6. The pixel signals in the partial image 51a are arranged in the same order as corresponding pixel signals in the entire image 50 are arranged, with respect to both a horizontal direction and a vertical direction.

Figure 7:
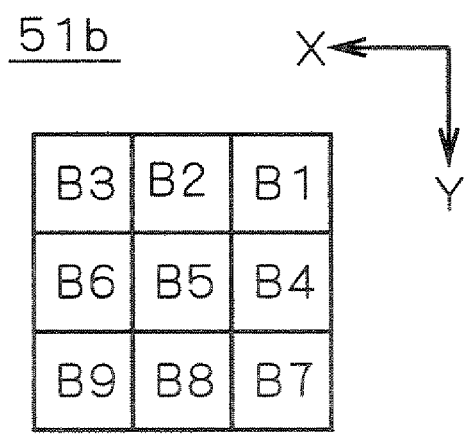
FIG. 7 illustrates a model of a partial image caused by B group.

The pixel signals caused by B group are sequentially output in a "B3, B2, B1, B6, B5, B4, B9, B8, and B7" sequence, starting from a pixel signal placed in the upper right. The partial image 51b having the foregoing signal sequence is represented as illustrated in FIG. 7. As illustrated in FIG. 7, while the pixel signals in the partial image 51b are arranged in the same order as corresponding pixel signals in the entire image 50 are arranged with respect to a vertical direction, the pixel signals in the partial image 51b are arranged in a reverse order to an order in which corresponding pixel signals in the entire image 50 are arranged with respect to a horizontal direction.

The pixel signals caused by C group are sequentially output in a "C7, C8, C9, C4, C5, C6, C1, C2, and C3" sequence, starting from a pixel signal placed in the lower left. The partial image 51c having the foregoing signal sequence is represented as illustrated in FIG. 8. As illustrated in FIG. 8, while the pixel signals in the partial image 51c are arranged in the same order as corresponding pixel signals in the entire image 50 are arranged with respect to a horizontal direction, the pixel signals in the partial image 51c are arranged in a reverse order to an order in which corresponding pixel signals in the entire image 50 are arranged with respect to a vertical direction.

The pixel signals caused by D group are sequentially output in a "D9, D8, D7, D6, D5, D4, D3, D2, and D1" sequence, starting from a pixel signal placed in the lower right. The partial image 51d having the foregoing signal sequence is represented as illustrated in FIG. 9. As illustrated in FIG. 9, the pixel signals in the partial image 51d are arranged in a reverse order to an order in which corresponding pixel signals in the entire image 50 are arranged with respect to both a horizontal direction and a vertical direction.

In carrying out the above-mentioned color interpolation in the step S4 in FIG. 2, a value of a color component missing in a given pixel signal must be obtained, which requires eight pixel signals surrounding the given pixel signal. The eight surrounding pixel signals are pixel signals respectively obtained in some of the light sensing cells 11 which are placed to surround a given light sensing cell 11 in which the given pixel signal is obtained. Thus, there is a need of combining the four partial images 51a, 51b, 51c, and 51d to create a composite image which is identical to the entire image 50 formed of pixel signals arranged in an order in which an array of the light sensing cells 11 is exactly reflected, by the time when the color interpolation is carried out. In the digital still camera 1, the image processor 2 is responsible for creating a composite image.

3. Creation of Composite Image

Figure 10:
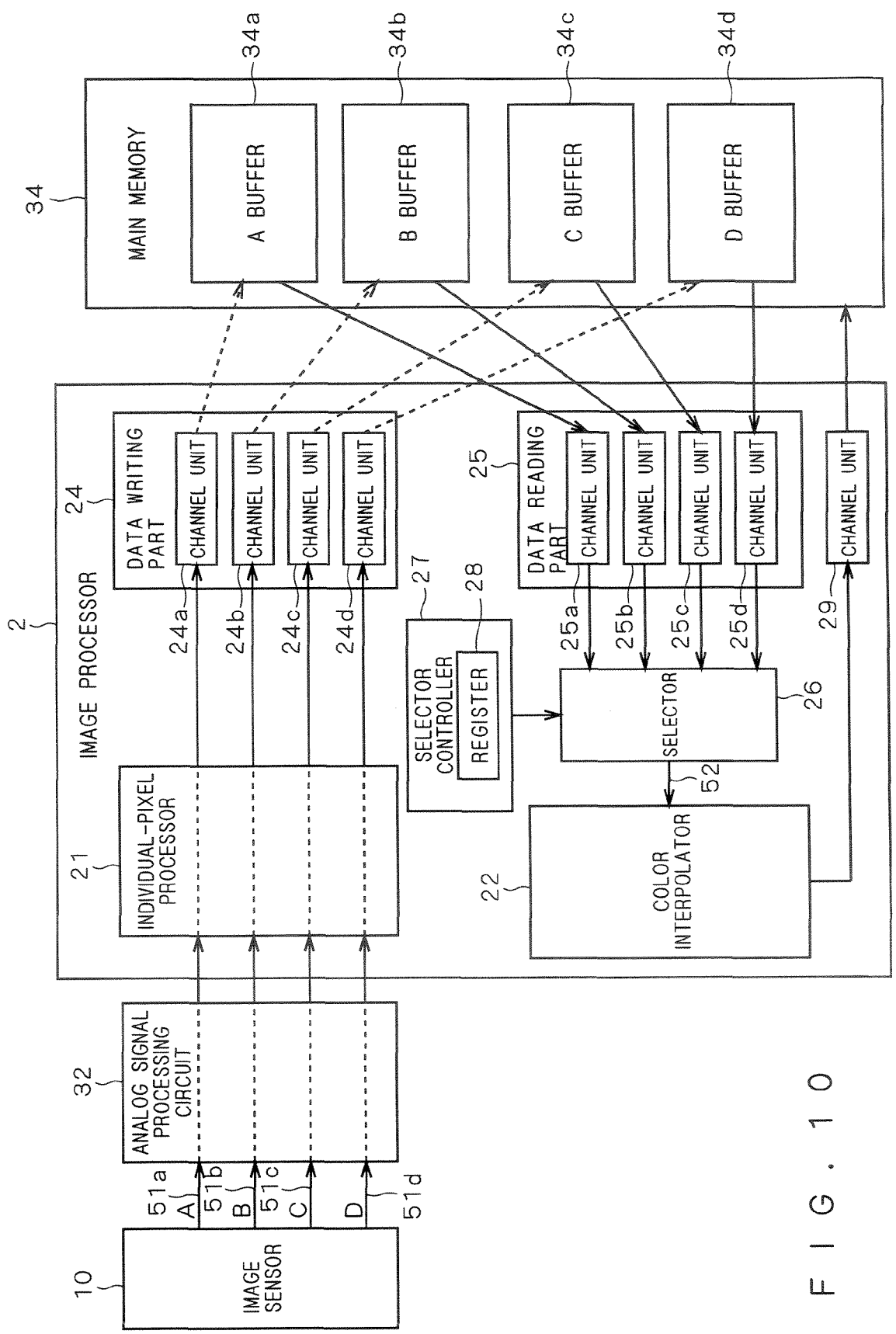
FIG. 10 illustrates a structure including elements related to functions of creating a composite image.

FIG. 10 illustrates a structure including elements related to functions of creating a composite image. As illustrated in FIG. 10, the image processor 2 includes a data writing part 24 for writing an image processed by the individual-pixel processor 21 into the main memory 34 and a data reading part 25 for reading out an image from the main memory 34.

The four partial images 51a, 51b, 51c, and 51d formed of pixel signals which are output from the image sensor 10 while being collected in four sets respectively for the four groups (in other words, group by group) are processed by the analog signal processing circuit 32 and the individual-pixel processor 21, independently of one another. Subsequently, the processed four partial images 51a, 51b, 51c, and 51d are input into the data writing part 24 in parallel with one another. As such, the data writing part 24 includes four channel units 24a, 24b, 24c, and 24d so that the four partial images 51a, 51b, 51c, and 51d can be transferred to the main memory 34 in parallel with one another.

Each of the channel units 24a, 24b, 24c, and 24d forms a single DMA channel and provides DMA transfer (data transfer achieved without requiring a process in the MPU 33 illustrated in FIG. 1) of an image from and to the main memory 34. Each of the channel units 24a, 24b, 24c, and 24d is provided with a FIFO serving as a buffer memory for data transfer, and pieces of data stored in each of the FIFOs are sequentially transferred via the bus 39 illustrated in FIG. 1.

As a result of data transfer provided by the channel units 24a, 24b, 24c, and 24d, the partial images 51a, 51b, 51c, and 51d are written into buffers 34a, 34b, 34c, and 34d, respectively, which are previously allocated in the main memory 34. More specifically, the partial image 51a caused by A group is stored in an A buffer 34a by the channel unit 24a, the partial image 51b caused by B group is stored in a B buffer 34b by the channel unit 24b, the partial image 51c caused by C group is stored in a C buffer 34c by the channel unit 24c, and the partial image 51d caused by D group is stored in a D buffer 34d by the channel unit 24d.

Transfer information which includes information required for transfer, such as an address in the main memory 34 where data should be written, is previously supplied to each of the channel units 24a, 24b, 24c, and 24d by the MPU 33 and is stored in a register included in each of the channel units 24a, 24b, 24c, and 24d. According to the transfer information, also a direction of an address in the main memory 34 (which will be hereinafter referred to as an "address direction") as to whether or not an address is increased ("increment") or decreased ("decrement") during data transfer is designated. Specifically, according to the transfer information which is supplied to each of the channel units 24a, 24b, 24c, and 24d, "increment" is designated as an address direction. Hence, by viewing contents stored in the main memory 34 sequentially in a direction in which an address is increased, a signal sequence of pixel signals in each of the partial images 51a, 51b, 51c, and 51d is maintained.

The partial images 51a, 51b, 51c, and 51d written into the main memory 34 in the foregoing manner are read out by the data reading part 25. The data reading part 25, as well as the data writing part 24, includes four channel units 25a, 25b, 25c, and 25d so that the four partial images 51a, 51b, 51c, and 51d are transferred from the main memory 34 in parallel with one another.

Each of the channel units 25a, 25b, 25c, and 25d forms a single DMA channel and provides DMA transfer of an image from and to the main memory 34. Each of the channel units 25a, 25b, 25c, and 25d is provided with a FIFO serving as a buffer memory for data transfer, and pieces of data transferred via the bus 39 are sequentially stored in each of the FIFOs.

As a result of data transfer provided by the channel units 25a, 25b, 25c, and 25d, the partial images 51a, 51b, 51c, and 51d are read out from the buffers 34a, 34b, 34c, and 34d of the main memory 34, respectively. For those read operations, pixel signals included in each of the partial images 51b, 51c, and 51d are read out in an order in which corresponding pixel signals in the entire image 50 are horizontally and vertically arranged (in other words, in an order in which corresponding light sensing cells 11 are horizontally and vertically arranged), and the signal sequence of the pixel signals in each of the partial images 51b, 51c, and 51d is changed. As a result, an order in which the pixel signals are horizontally and vertically arranged in each of the partial images 51a, 51b, 51c, and 51d matches an order in which corresponding pixel signals in the entire image 50 are horizontally and vertically arranged. The transfer information indicating a starting address, an address direction, and the like which is required for data transfer in reading out the partial images is previously supplied to the channel units 25a, 25b, 25c, and 25d by the MPU 33 and is stored in a register included in each of the channel units 25a, 25b, 25c, and 25d. Then, each of the channel units 25a, 25b, 25c, and 25d provides data transfer while manipulating addresses according to the previously-supplied pieces of the transfer information, to thereby control a signal sequence of pixel signals.

In the channel unit 25a adapted to operate for A group, the first address of data of the partial image 51a is designated as a starting address and "increment" is designated as an address direction. Then, all the pixel signals included in the partial image 51a are read out.

Figure 11:
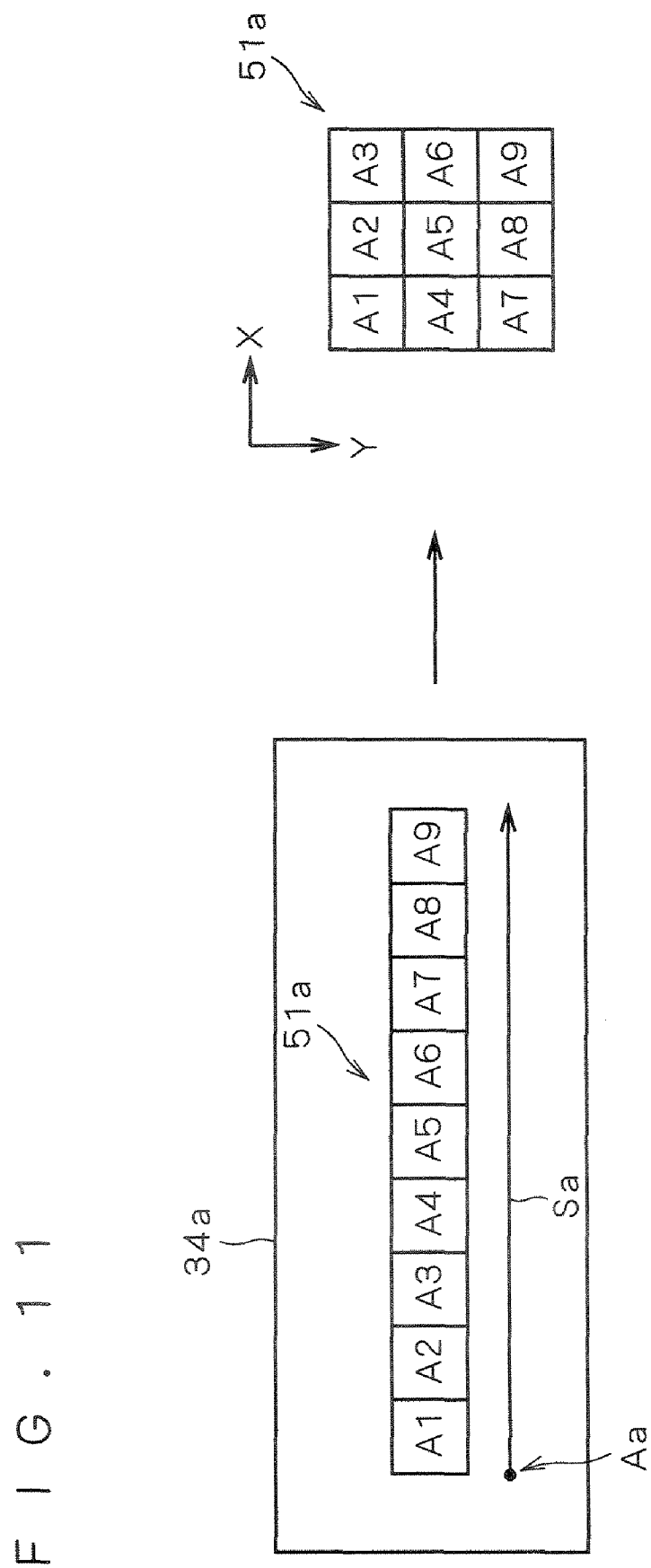
FIG. 11 explains a method for reading out the partial image caused by A group.

Details of the read operation on the partial image 51a will be given using the model of the partial image 51a which has been referred to above (see FIG. 6). On the left-hand side of FIG. 11, a state in which the model of the partial image 51a is stored in the A buffer 34a is illustrated. All the pixel signals included in the model of the partial image 51a are sequentially read out by the channel unit 25a in a direction in which an address is increased, starting from the first address Aa of data (step Sa). As a result, the partial image 51a is read out without involving a change in the signal sequence of the pixel signals included therein. Accordingly, an order in which the pixel signals in the partial image 51a are arranged matches an order in which corresponding pixel signals in the entire image 50 are arranged with respect to a horizontal direction and a vertical direction as illustrated on the right-hand side of FIG. 11.

In the channel unit 25b adapted to operate for B group, a sum of the first address of data of the partial image 51b and the number of addresses for m pixel signals (m is the number of pixel signals included in a single horizontal line) is designated as a starting address and "decrement" is designated as an address direction. Then, m pixel signals (in other words, one horizontal line) are read out. Subsequently, a sum of the last address in reading out the one horizontal line and the number of addresses for m×2 pixel signals is designated as a second starting address, and "decrement" is designated as an address direction. Then, a next horizontal line is read out. Thereafter, the same read operation as described above is performed from one horizontal line to another horizontal line, so that all the pixel signals included in the partial image 51b are read out.

Figure 12:
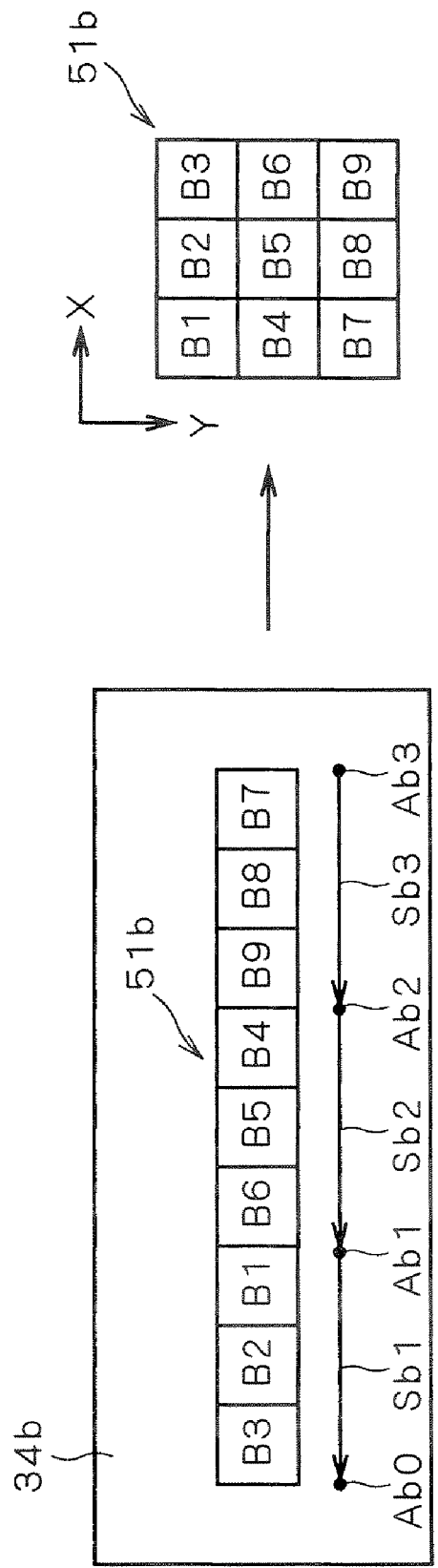
FIG. 12 explains a method for reading out the partial image caused by B group.

Details of the read operation on the partial image 51b will be given using the model of the partial image 51b which has been referred to above (see FIG. 7). On the left-hand side of FIG. 12, a state in which the model of the partial image 51b is stored in the B buffer 34b is illustrated. First, an address Ab1 which is equal to a sum of the first address Ab0 of data and the number of addresses for three pixels signals (m=3 in the present example) is designated as a starting address, and three pixel signals (B1, B2, and B3) included in the first horizontal line are read out by the channel unit 25b in a direction in which the address is decreased (step Sb1).

Next, an address Ab2 which is equal to a sum of the last address Ab0 in reading out the first horizontal line and the number of addresses for 3×2 pixel signals is designated as a second starting address, and three pixel signals (B4, B5, and B6) included in the second horizontal line are read out in a direction in which the address is decreased (step Sb2). Further, an address Ab3 which is equal to a sum of the last address Ab1 in reading out the second horizontal line and the number of addresses for 3×2 pixel signals is designated as a third starting address, and three pixel signals (B7, B8, and B9)

included in the third horizontal line are read out in a direction in which the address is decreased (step Sb3).

In this manner, the signal sequence of the pixels signals included in the partial image 51*b* is changed to a "B1, B2, B3, B4, B5, B6, B7, B8, and B9" sequence. As illustrated on the right-hand side of FIG. 12, the pixel signals in the partial image 51*b* are arranged in the same order as corresponding pixel signals in the entire image 50 are arranged with respect to a horizontal direction and a vertical direction.

In the channel unit 25*c* adapted to operate for C group, a result of subtraction of the number of addresses for m pixel signals from the last address of data for the partial image 51*c* is designated as a starting address and "increment" is designated as an address direction. Then, m pixel signals (in other words, one horizontal line) are read out. Subsequently, a result of subtraction of the number of addresses for m×2 pixel signals from the last address in reading out the one horizontal line is designated as a second starting address, and "increment" is designated as an address direction. Then, a next horizontal line is read out. Thereafter, the same read operation as described above is performed from one horizontal line to another horizontal line, so that all the pixel signals included in the partial image 51*c* are read out.

Details of the read operation on the partial image 51*c* will be given using the model of the partial image 51*c* which has been referred to above (see FIG. 8). On the left-hand side of FIG. 13, a state in which the model of the partial image 51*c* is stored in the C buffer 34*c* is illustrated. First, an address Ac1 which is a result of subtraction of the number of addresses for three pixel signals from the last address Ac0 of data is designated as a starting address, and three pixel signals (C1, C2, and C3) included in the first horizontal line are read out by the channel unit 25*c* in a direction in which the address is increased (step Sc1).

Next, an address Ac2 which is a result of subtraction of the number of addresses for 3×2 pixel signals from the last address Ac0 in reading out the first horizontal line is designated as a second starting address, and three pixel signals (C4, C5, and C6) included in the second horizontal line are read out in a direction in which the address is increased (step Sc2). Further, an address Ab3 which is a result of subtraction of the number of addresses for 3×2 pixel signals from the last address Ac1 in reading out the second horizontal line is designated as a third starting address, and three pixel signals (C7, C8, and C9) included in the third horizontal line are read out in a direction in which the address is decreased (step Sc3).

In this manner, the signal sequence of the pixels signals included in the partial image 51*c* is changed to a "C1, C2, C3, C4, C5, C6, C7, C8, and C9" sequence. As illustrated on the right-hand side of FIG. 13, the pixel signals in the partial image 51*c* are arranged in the same order as corresponding pixel signals in the entire image 50 are arranged with respect to a horizontal direction and a vertical direction.

In the channel unit 25*d* adapted to operate for D group, the last address of data of the partial image 51*d* is designated as a starting address and "decrement" is designated as an address direction. Then, all the pixel signals included in the partial image 51*d* are read out.

Figure 14:
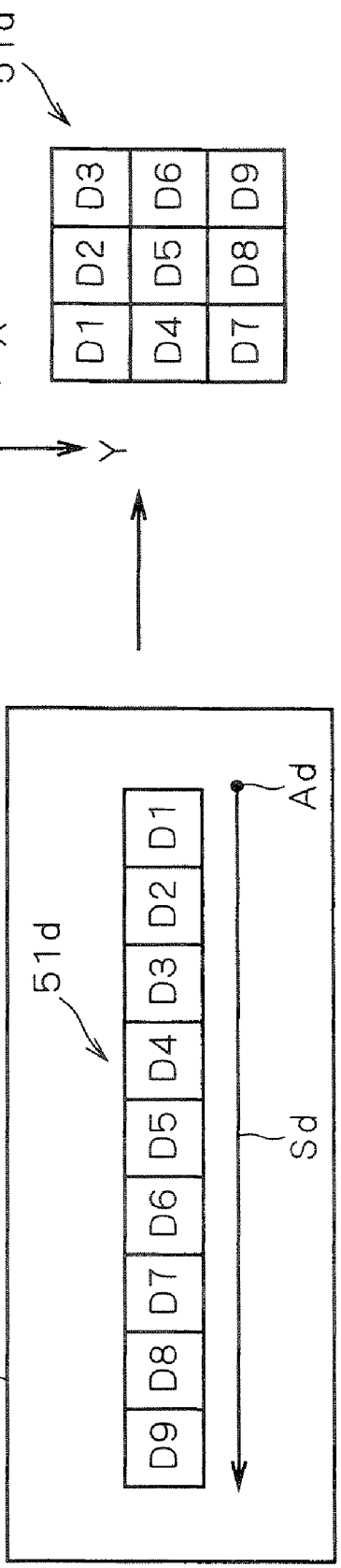
FIG. 14 explains a method for reading out the partial image caused by D group.

Details of the read operation on the partial image 51*d* will be given using the model of the partial image 51*d* which has been referred to above (see FIG. 9). On the left-hand side of FIG. 14, a state in which the model of the partial image 51*d* is stored in the D buffer 34*d* is illustrated. The last address "Ad" of the data is designated as a starting address, and all the pixel signals in the partial image 51*d* are read out by the channel unit 25*d* in a direction in which the address is decreased (step Sd). As a result, the signal sequence of the pixel signals in the partial image 51*d* is inverted, to be changed to a "D1, D2, D3, D4, D5, D6, D7, D8, and D9" sequence. Accordingly, an order in which the pixel signals in the partial image 51*d* are arranged matches an order in which corresponding pixel signals in the entire image 50 are arranged with respect to a horizontal direction and a vertical direction as illustrated on the right-hand side of FIG. 14.

By performing the above-described read operations, the respective orders in which the pixel signals in the partial images 51*a*, 51*b*, 51*c*, and 51*d* caused by A, B, C, and D group are horizontally and vertically arranged match the orders in which corresponding pixel signals in the entire image 50 are horizontally and vertically arranged. The respective read operations for reading out the partial images 51*a*, 51*b*, 51*c*, and 51*d* are performed in parallel with one another. For those read operations, all the pixel signals caused by each of A group and D group can be read out at a time. On the other hand, the pixel signals caused by each of B group and C group can be read out from one horizontal line to another horizontal line. Thus, it is sufficient to manipulate addresses at least for each of horizontal lines, in order to read out the partial images 51*a*, 51*b*, 51*c*, and 51*d*. The reason for this is that the differences between the array of the pixel signals in the partial images 51*b*, 51*c*, and 51*d* which are read out from the image sensor 10 and the array of the pixel signals in the entire image 50 lie in orders re not produced by rotation of an image, but orders in which pixel signals are horizontally and vertically arranged.

Referring back to FIG. 10, the four partial images 51*a*, 51*b*, 51*c*, and 51*d* each including pixel signals which are arranged in the same order as corresponding pixel signals in the entire image 50 are arranged are input to a selector 26 included in the image processor 2 with the respective signal sequences being maintained. The image processor 2 further includes a selector controller 27 for controlling the selector 26. The selector 26 selects and outputs pixel signals included in the partial images 51*a*, 51*b*, 51*c*, and 51*d* one by one based on a control signal supplied from the selector controller 27. Then, the selected pixel signals are connected, to form a single composite image 52.

Also, the selector controller 27 includes a register 28. Group information indicating a sequence of the groups, according to which the light sensing cells 11 each belonging to any of the groups in the light sensor 19 of the image sensor 10 are arranged, is previously supplied to the register 28 by the MPU 33 and recorded on the register 28. More specifically, "A, B, C, D, A, B, C, D, . . . " or the like is recorded, as contents of the group information, on the register 28.

The selector controller 27 instructs the selector 26 to select a pixel signal included in one of the partial images caused by one of the groups in accordance with the group information. As a result of such control, the selector 26 outputs the composite image 52 formed of pixel signals having the same signal sequence of pixel signals as the entire image 50.

Figure 15:
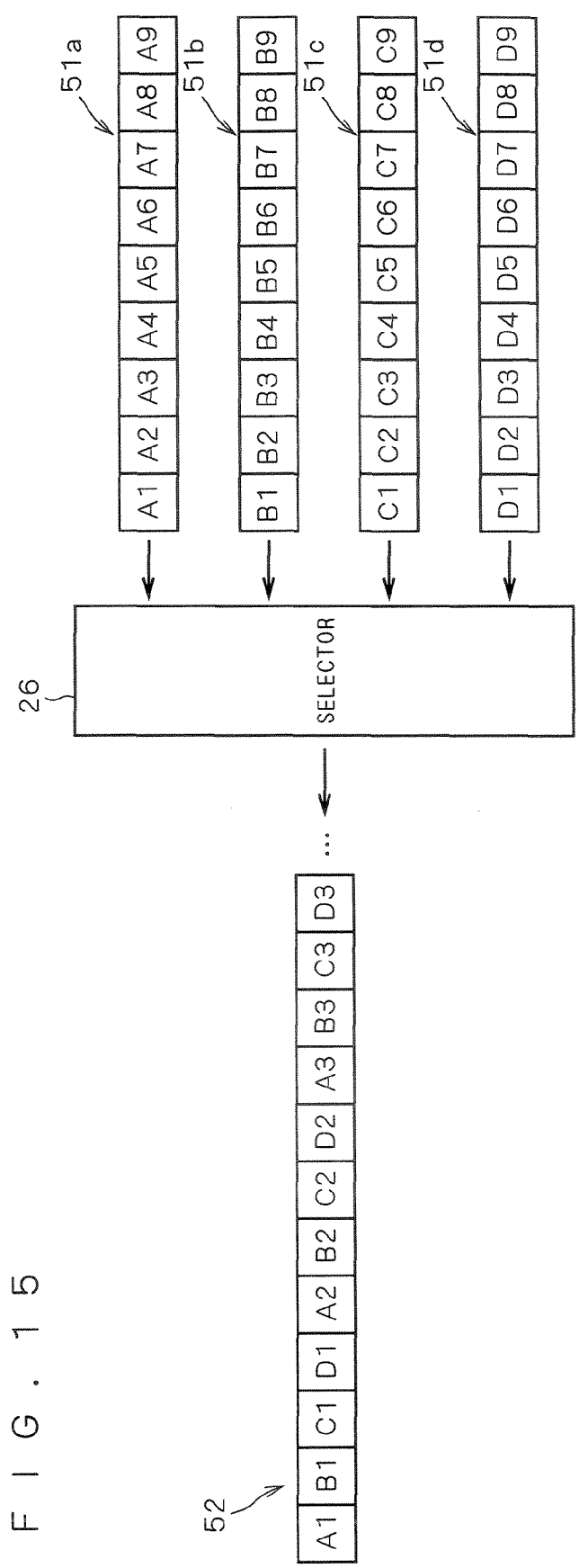
FIG. 15 explains operations performed by a selector.

FIG. 15 is a view for explaining the above-mentioned operations of the selector 26, using the model which has been referred to above. As described above, the four partial images 51*a*, 51*b*, 51*c*, and 51*d* are input to the selector 26, and all the pixel signals included in the partial images 51*a*, 51*b*, 51*c*, and 51*d* as input are arranged in the same order as corresponding pixel signals in the entire image 50 with respect to both a horizontal direction and a vertical direction.

The selector 26 sequentially selects the pixel signals in the partial images 51*a*, 51*b*, 51*c*, and 51*d*, starting from the first pixel signal. An order in which the selector 26 selects the pixel signals conforms to the group information, i.e., "A, B, C, D, A, B, C, D, . . . ". Accordingly, the pixel signals are connected in an order, "A1, B1, C1, D1, A2, B2, C2, D2, A3, B3, C3, D3, . . ." as illustrated in FIG. 15. The signal sequence of the pixel signals in the composite image 52 which is created in the foregoing manner matches the signal sequence of the pixel signals in the entire image 50 illustrated in FIG. 5. In other words, the entire image 50 is re-created in effect. Thus, the composite image 52 in which the signal sequence of pixel signals conforms to the two-dimensional array of the light sensing cells 11 can be created.

The created composite image 52 is input to the color interpolator 22, and the color interpolator 22 carries out color interpolation on the composite image 52. Thereafter, the composite image 52 is transferred to the main memory 34 by a channel unit 29 additionally included in the image processor 2 (refer to FIG. 10).

As is made clear from the above description, in the image processor 2 according to the present preferred embodiment, when pixel signals supplied from the light sensing cells 11 belonging to a given group are sequentially output in a reverse order to an order in which the pixel signals are arranged in a two-dimensional array, with respect to at least one of a horizontal direction and a vertical direction, an order in which the pixel signals are transferred by the data reading part 25 conforms to an order in which corresponding light sensing cells 11 are arranged in the two-dimensional array with respect to a horizontal direction and a vertical direction. Then, the pixel signals which are collected in plural sets respectively for the groups (in other words, group by group) are selected by the selector 26 in accordance with a sequence of the groups. Accordingly, even in a case where the image sensor 10 illustrated in FIG. 3 is employed, pixel signals can be supplied from the selector 26 in the same order as the light sensing cells 11 are arranged in a two-dimensional array, to thereby facilitate later image processing such as color interpolation.

Further, for a read operation performed by the data reading part 25 which reads out data from the main memory 34, it is sufficient to manipulate addresses at least for each of horizontal lines. Moreover, the partial images 51a, 51b, 51c, and 51d caused by A, B, C, and D groups are read out in parallel with one another by the channel units 25a, 25b, 25c, and 25d. As such, a time period taken to read out can be significantly reduced as compared to a case where the four partial images 51a, 51b, 51c, and 51d are read out in a random-access manner in which an address is designated for each of pixel signals included in the four partial images 51a, 51b, 51c, and 51d. Hence, it is possible to rapidly create a composite image formed of pixel signals which are arranged in the same order as the light sensing cells 11 are arranged in a two-dimensional array.

4. Other Preferred Embodiments

Hereinabove, one preferred embodiment of the present invention has been described. However, the present invention is not limited to the above-described preferred embodiment (which will hereinafter be referred to as a "representative preferred embodiment"), and various modifications are possible. Below, other preferred embodiments which are acquired by modifying the representative preferred embodiment will be described.

<4-1. Permutation of Signals in Reading>

According to the representative preferred embodiment, respective signal sequences of pixel signals in the partial images 51a, 51b, 51c, and 51d are changed when the partial images 51a, 51b, 51c, and 51d are read out from the main memory 34 by the data reading part 25, as described above.

Alternatively, the respective signal sequences of the pixel signals in the partial images 51a, 51b, 51c, and 51d may be changed when the partial images 51a, 51b, 51c, and 51d are written into the main memory 34 by the data writing part 24. Also in this alternative embodiment, the transfer information is previously supplied to the channel units 24a, 24b, 24c, and 24d of the data writing part 24 and is stored in the register provided in each of the channel units 24a, 24b, 24c, and 24d. Then, each of the signal sequences of the pixel signals can be changed by data transfer provided by each of the channel units 24a, 24b, 24c, and 24d which manipulates addresses according to the previously-supplied transfer information at the same time.

More specifically, in the channel unit 24a adapted to operate for A group, there is no need of changing the signal sequence of the pixel signals. Thus, all that is needed is to designate the first address in a region where the partial image 51a should be recorded, as a starting address while designating "increment" as an address direction, and to write all the pixel signals in the partial image 51a.

In the channel unit 24b adapted to operate for B group, a sum of the first address in a region where the partial image 51b should be recorded and the number of addresses for m pixel signals is designated as a starting address, and "decrement" is designated as an address direction. Then, one horizontal line is written. Subsequently, a sum of the last address in writing the one horizontal line and the number of addresses for m×2 pixel signals is designated as a second starting address, and "decrement" is designated as an address direction. Then, another horizontal line laid next to the written horizontal line is written. Thereafter, the same write operation as describe above is repeated from one horizontal line to another horizontal line.

In the channel unit 24c adapted to operate for C group, a result of subtraction of the number of addresses for m pixel signals from the last address in a region where the partial image 51c should be recorded is designated as a starting address, and "increment" is designated as an address direction. Then, one horizontal line is written. Subsequently, a result of subtraction of the number of addresses for m×2 pixel signals from the last address in writing the one horizontal line is designated as a second starting address, and "increment" is designated as an address direction. Then, another horizontal line laid next to the written horizontal line is written. Thereafter, the same write operation as describe above is repeated from one horizontal line to another horizontal line.

In the channel unit 24d adapted to operate for D group, the last address in a region where the partial image 51d should be recorded is designated as a starting address and "decrement" is designated as an address direction. Then, all the pixel signals in the partial image 51d are written.

On the other hand, in the alternative embodiment, each of the channel units 25a, 25b, 25c, and 25d of the data reading part 25 reads out all the pixel signals in the corresponding partial image with the first address of data of the partial image and "increment" being designated as a starting address and an address direction, respectively. By the foregoing operations, the same effects as produced in the representative preferred embodiment can be produced.

Further, in both of a case where a signal sequence is changed during a read operation and a case where a signal sequence is changed during a write operation, "increment" and "decrement" may be interchanged with each other in the above description.

<4-2. Method for Output>

According to the representative preferred embodiment, pixel signals in each of three partial images 51b, 51c, and 51d respectively caused by B, C, and D groups are output in a reverse order to an order in which corresponding light sensing cells 11 are arranged. Alternatively, if pixel signals in at least one partial image caused by one group are output in a reverse order to an order in which corresponding light sensing cells 11 are arranged, the above-described techniques according to the representative preferred embodiment can be suitably applied.

Figure 16:
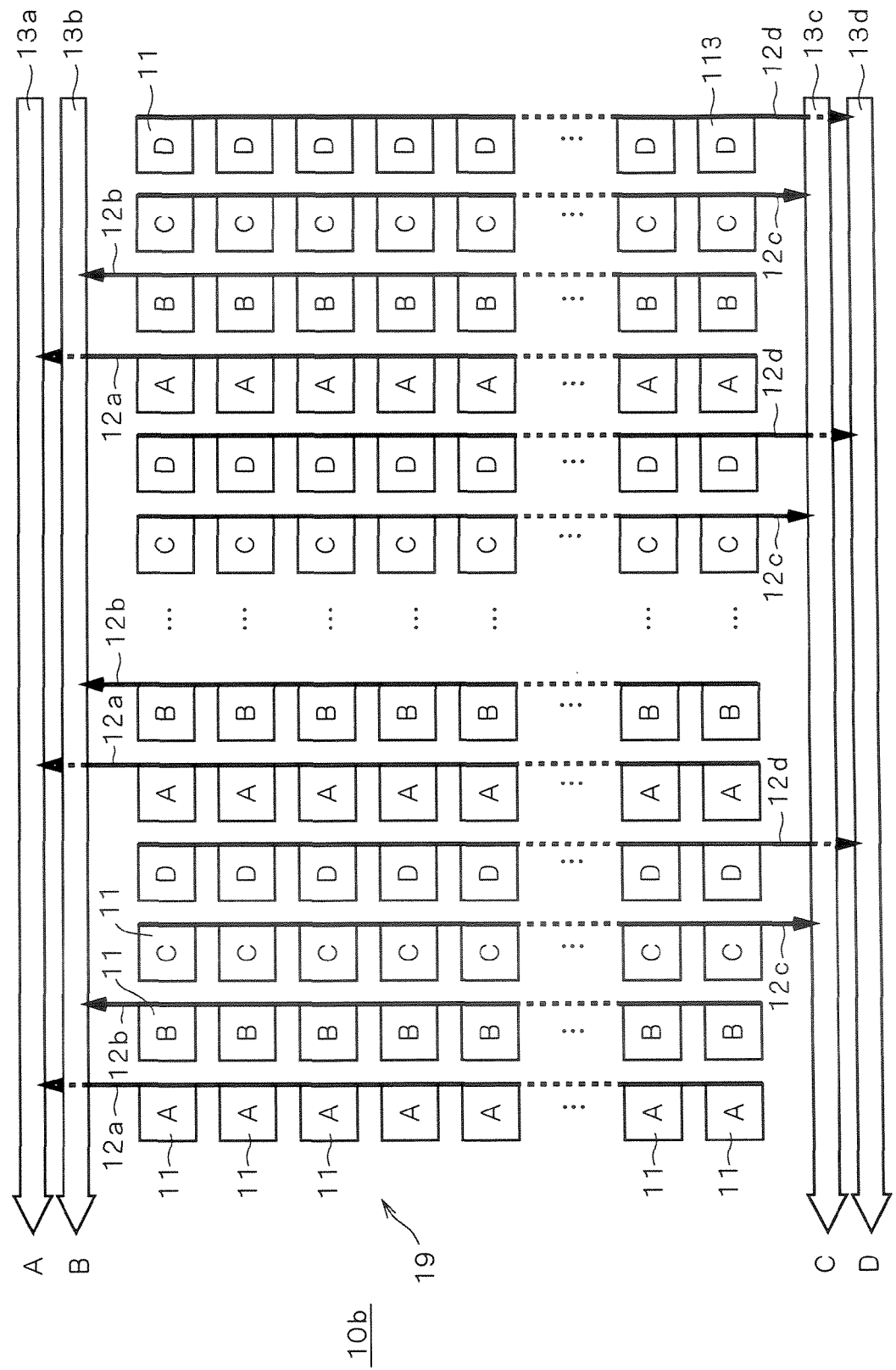
FIGS. 16, 17 and 18 illustrate examples of the image sensor.

For example, in an image sensor 10*b* illustrated in FIG. 16, pixel signals obtained in light sensing cells 11 belonging to A and B groups are transferred to the upper side of FIG. 16 by the vertical transfer parts 12*a* and 12*b*, and thereafter, are transferred to the left-hand side of FIG. 16 by the horizontal transfer parts 13*a* and 13*b*. On the other hand, pixel signals obtained in light sensing cells 11 belonging to C and D groups are transferred to the lower side of FIG. 16 by the vertical transfer parts 12*c* and 12*d*, and thereafter, are transferred to the left-hand side of FIG. 16 by the horizontal transfer parts 13*c* and 13*d*.

Accordingly, in each of A and B groups, the pixel signals are output in the same order as corresponding pixel signals in the entire image 50 are arranged. In contrast, in each of C and D groups, pixel signals are output in a reverse order to an order in which corresponding pixel signals in the entire image 50 are arranged with respect to a vertical direction. In this alternative embodiment, partial images caused by A and B groups are handled in the same manner as the partial image 51*a* caused by A group in the representative preferred embodiment, while partial images caused by C and D groups are handled in the same manner as the partial image 51*c* caused by C group in the representative preferred embodiment in applying the above-described techniques.

Figure 17:
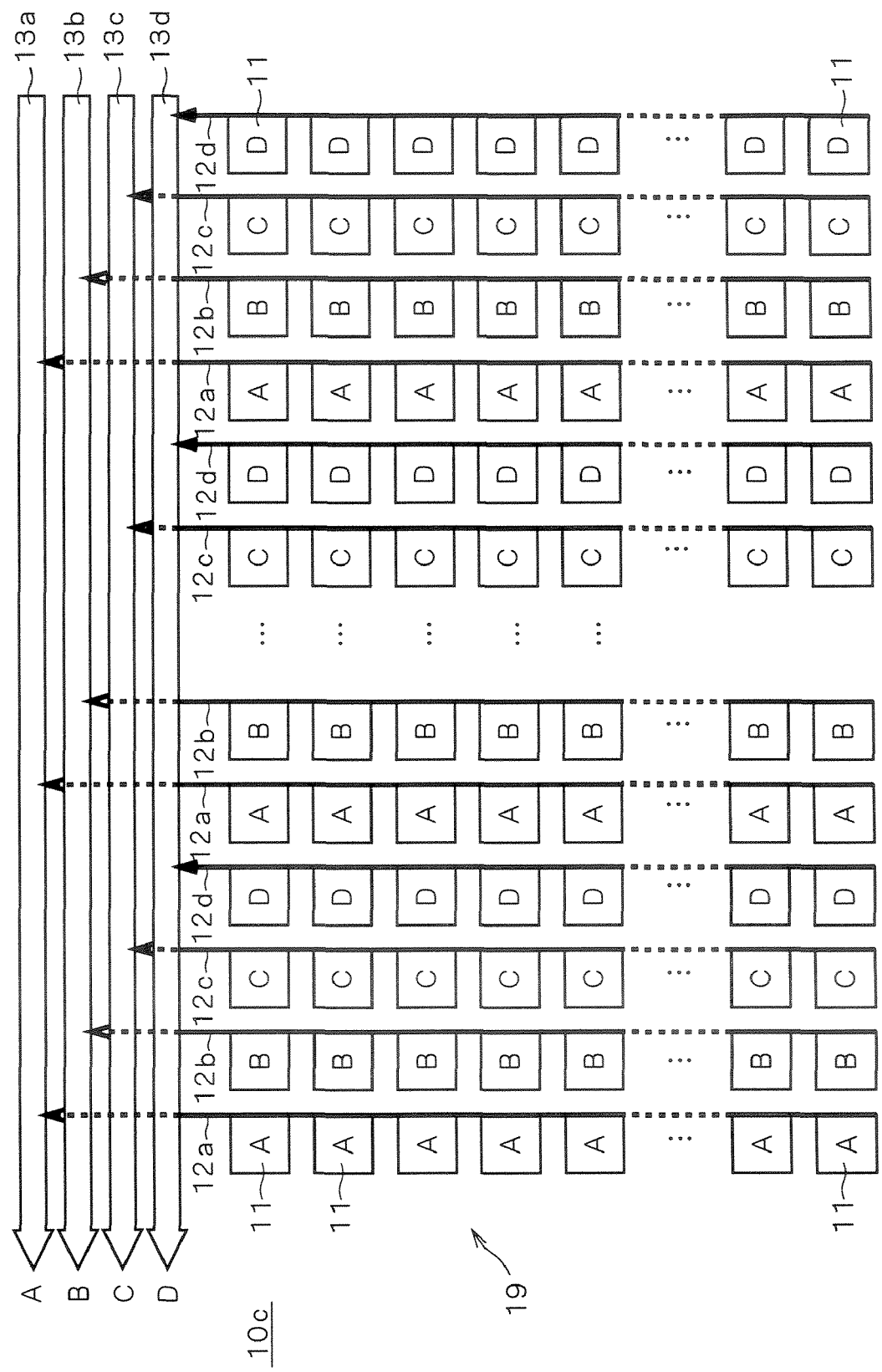

Additionally, even if an image sensor 10*c* illustrated in FIG. 17 in which pixel signals in each of partial images caused by all of the groups are output in the same order as corresponding light sensing cells 11 are arranged is employed, partial images output from the image sensor 10*c* can be handled in the same manner by utilizing the techniques described in the representative preferred embodiment, as a matter of course.

<4-3. Arrangement of Groups>

According to the representative preferred embodiment, A, B, C, and D groups are arranged in the order mentioned. However, the number and arrangement of the groups are not limited to those described in the representative preferred embodiment. For example, an image sensor may have a structure in which light sensing cells belonging to a half of a plurality of groups are placed in one of two arbitrary horizontal lines laid adjacent to each other, and the other light sensing cells belonging to the other half of the plurality of groups are placed in the other horizontal line.

Figure 18:
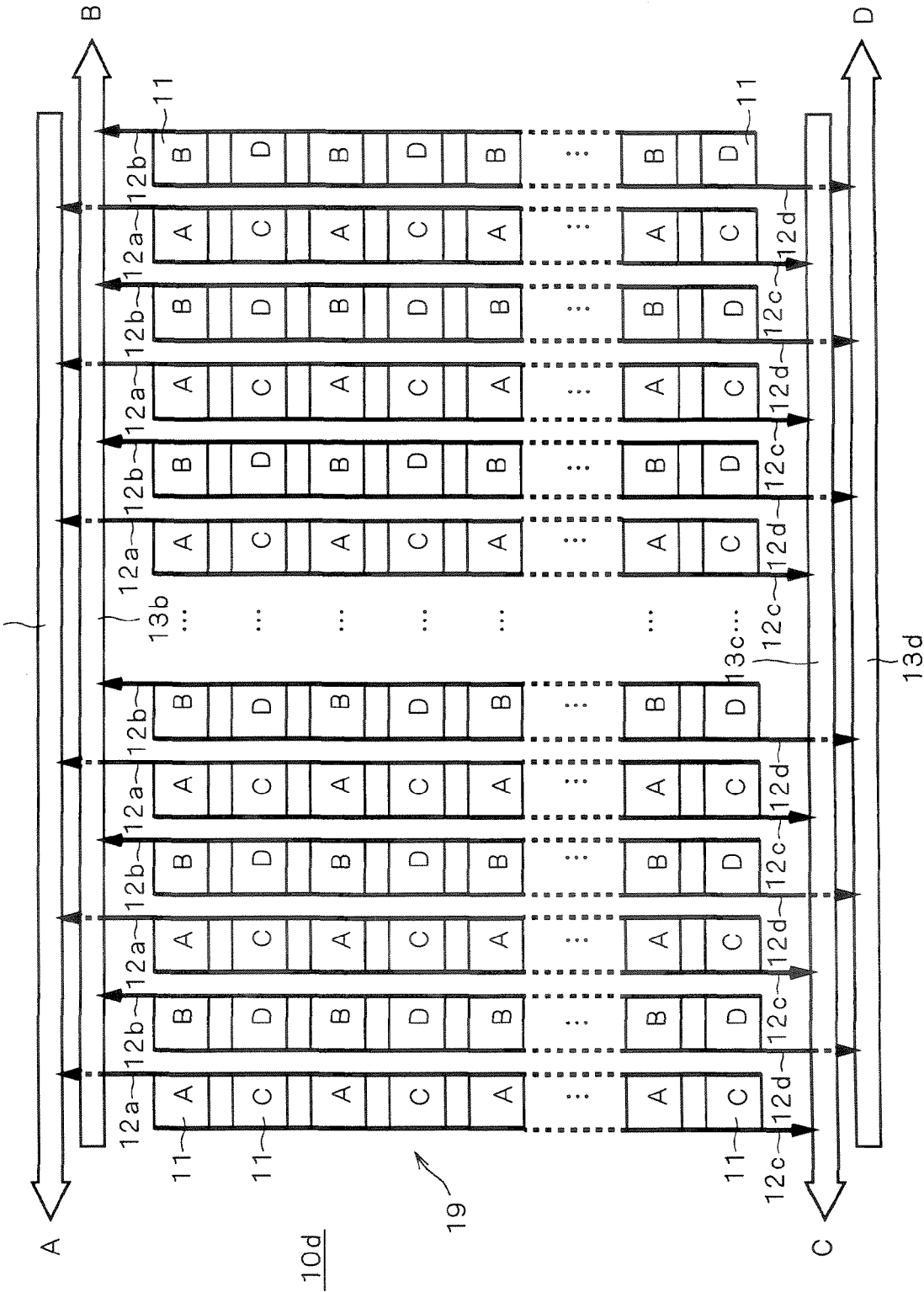

A more specific description will be given below. Referring to FIG. 18, an image sensor 10*d* illustrated in FIG. 18 includes light sensing cells 11 each belonging to any of four groups of A, B, C, and D groups. Then, assuming that the uppermost horizontal line is numbered one, some of the light sensing cells belonging to A and B groups are placed in only odd-numbered horizontal lines and the other light sensing cells belonging to C and D groups are placed in only even-numbered horizontal lines. The above-described techniques according to the representative preferred embodiment can be suitably applied also to the alternative embodiment exemplified in FIG. 18, provided that four partial images respectively caused by the four groups are output independently of one another.

Further, according to the alternative embodiment exemplified in FIG. 18, each of the horizontal lines of the image sensor 10*d* includes only light sensing cells each belonging to either of two groups, i.e., a half of the four groups. Thus, it is possible to reduce the number of channel units provided in the data reading part 25 as compared to that in the representative preferred embodiment. In this regard, details will be given as follows.

Figure 19:
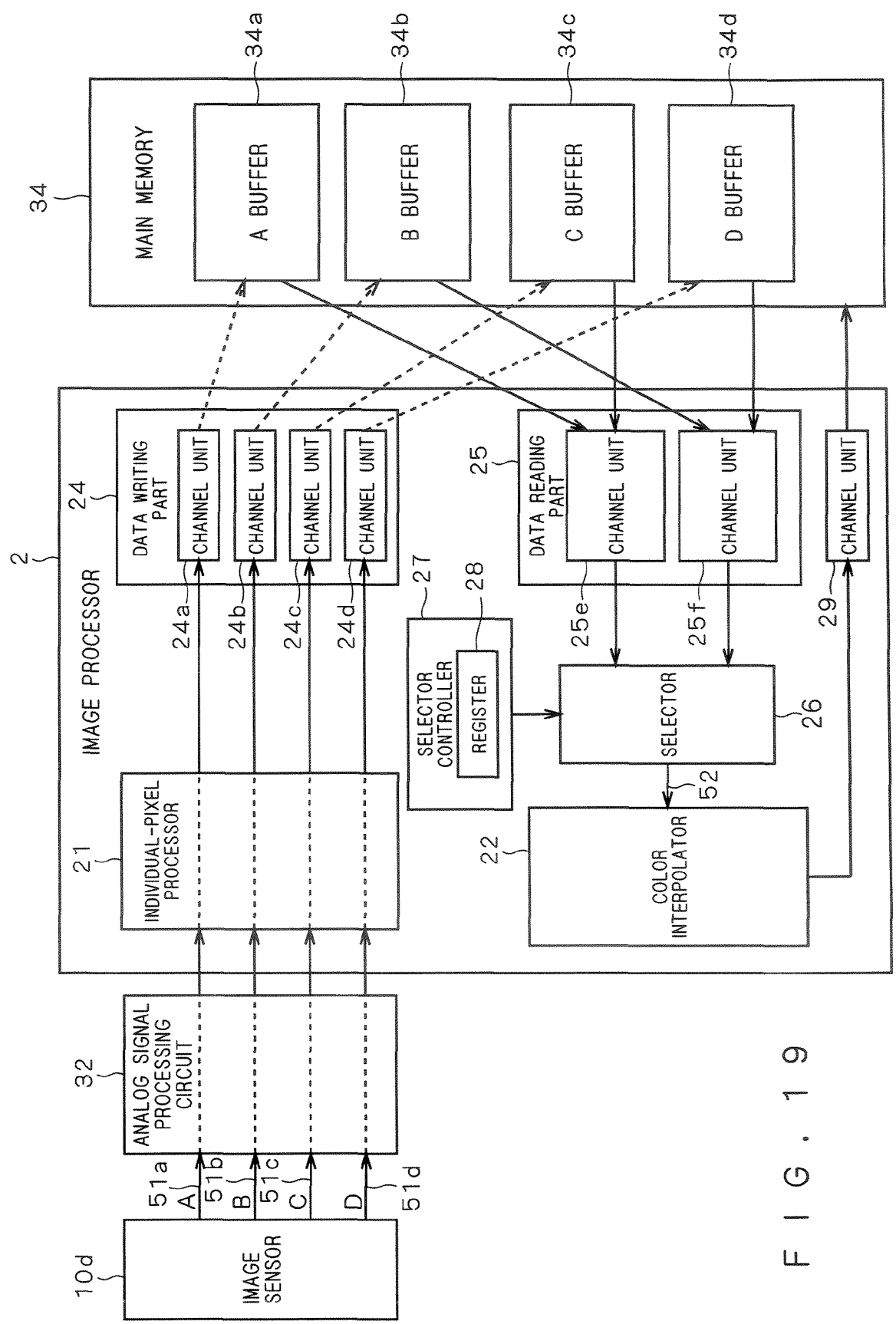
FIG. 19 illustrates another structure including elements related to functions of creating a composite image.

FIG. 19 illustrates a structure including elements related to functions of creating a composite image according to the alternative embodiment exemplified in FIG. 18. The structure illustrated in FIG. 19 is similar to the structure illustrated in FIG. 10, but is different from the structure illustrated in FIG. 10 in that the data reading part 25 includes only two channel units 25*e* and 25*f*.

Now, assume a situation in which a composite image 52 which is identical to an entire image obtained in the image sensor 10*d* illustrated in FIG. 18 is created in the selector 26. At the time of creating odd-numbered horizontal lines of the composite image 52, while partial images respectively caused by A and B groups need to be input to the selector 26, partial images respectively caused by C and D groups need not be input to the selector 26. Conversely, at the time of creating even-numbered horizontal lines, while partial images respectively caused by C and D groups need to be input to the selector 26, partial images respectively caused by A and B groups need not be input to the selector 26. Accordingly, it is sufficient to simultaneously input only partial images caused by two groups to the selector 26 from the data reading part 25.

In view of the foregoing, the data reading part 25 illustrated in FIG. 19 includes only the two channel units 25*e* and 25*f*. The channel unit 25*e* is used for reading the partial images respectively caused by A and C groups, and the channel unit 25*f* is used for reading the partial images respectively caused by B and D groups.

More specifically, in creating odd-numbered horizontal lines of the composite image 52, the channel unit 25*e* reads out the partial image caused by A group and the channel unit 25*f* reads out the partial image caused by B group. Then, in creating even-numbered horizontal lines of the composite image 52, the channel unit 25*e* reads out the partial image caused by C group and the channel unit 25*f* reads out the partial image caused by D group. Namely, pixel signals in one horizontal line of a partial image caused by one of two groups and pixel signals in one horizontal line of a partial image caused by the other of the two groups are alternately transferred by each of the channel units 25*e* and 25*f*. During the transfer of the pixel signals, a signal sequence of the pixel signals in each of the partial images is changed by the channel unit 25*e* or 25*f* in the same manner as in the representative preferred embodiment.

As described above, by using one channel unit for two groups, it is possible to reduce the number of channel units included in the data reading part 25. This allows for simplification of the structure of the image processor 2.

<4-4. Other Modifications>

According to the representative preferred embodiment, an arrangement of the filters each of which is adapted to generate any of three color components and an arrangement of the groups are not correlated to each other. Alternatively, the light sensing cells 11 may be arranged such that each of the groups includes only light sensing cells 11 related to the same color component. Additionally, in a case where an arrangement of the groups illustrated in FIG. 18 is employed, if filters are arranged in Bayer pattern, each of the groups should include only light sensing cells 11 related to the same color component. In that case, a partial image includes only pixel signals caused by the same group, so that necessary image processing can be performed for each of color components prior to creating a composite image.

Further, the image sensor includes a CCD sensor according to the representative preferred embodiment. However, even though an image sensor includes a C-MOS sensor, the same techniques described above can be applied.

Moreover, according to the representative preferred embodiment, an example in which the image processor is applied to a digital still camera has been described. However, the same image processor as described above can be suitably applied to other image capture apparatuses such as a video camera and a scanner, which include other types of image sensors than the image sensor according to the representative preferred embodiment.

While the invention has been shown and described in detail, the foregoing description is in all aspects illustrative and not restrictive. It is therefore understood that numerous modifications and variations can be devised without departing from the scope of the invention.

What is claimed is:

1. An image processor for controlling transfer of pixel signals between an image sensor and a memory storing said pixel signals in association with respective addresses, wherein said image sensor includes a plurality of light sensing cells each belonging to any of a plurality of groups, which are arranged in a two-dimensional array defined by a first direction and a second direction, said image sensor outputs said pixel signals which are obtained in said plurality of light sensing cells, some of said pixel signals obtained in some of said plurality of light sensing cells which belong to one of said plurality of groups are sequentially output in a reverse order to an order in which said some of plurality of light sensing cells are arranged in said two-dimensional array with respect to at least one of said first direction and said second direction, and said image processor comprises:
    a transfer part which collects pixel signals from light sensing cells of the same group in sets for each of the plurality of groups, each group is arranged such that each light sensing cell of a group does not directly adjoin another light sensing cell of the same group in the first or second direction in the two-dimensional array, the transfer part sequentially transfers said pixel signals which are collected in sets respectively for said plurality of groups and supplied from said plurality of light sensing cells in an order in which corresponding light sensing cells are arranged in either said first direction and said second direction of said two-dimensional array while manipulating said respective addresses, the transfer part including channel units which transfer pixel signals of the groups in parallel;
    a selector which sequentially selects pixel signals from each of the groups and outputs an output sequence of a plurality of said pixel signals according to an order in which corresponding light sensing cells are arranged in said image sensor, wherein each of the plurality of said pixel signals in said output sequence are obtained from a different light sensing cell of the plurality of light sensing cells and said output sequence includes a pixel signal from each of the plurality of light sensing cells of the image sensor; and
    a color interpolator which color interpolates said output sequence of the plurality of said pixel signals.

2. The image processor according to claim 1, wherein said transfer part includes a reading part which reads out said pixel signals from said memory.

3. The image processor according to claim 2, wherein some of said plurality of light sensing cells which belong to a half of said plurality of groups are placed in one of two arbitrary horizontal lines laid adjacent to each other, and the others of said plurality of light sensing cells which belong to the other half of said plurality of groups are placed in the other of said two arbitrary horizontal lines, in said image sensor,
said transfer part includes channel units, of which number is equal to a half of the number of said plurality of groups,
two sets of pixel signals which are respectively caused by two groups are alternately transferred from one horizontal line to another horizontal line by each of said channel units.

4. The image processor according to claim 2, wherein said reading part reads out said pixel signals from said memory according to an order in which corresponding light sensing cells are arranged in said image sensor.

5. The image processor according to claim 1, wherein said transfer part includes a writing part which writes said pixel signals into said memory.

6. The image processor according to claim 5, wherein said writing part writes said pixel signals into said memory according to an order in which corresponding light sensing cells are arranged in said image sensor.

7. The image processor according to claim 1, wherein said first direction is a horizontal direction and said second direction is a vertical direction.

8. The image processor according to claim 1, wherein the two-dimensional array includes four groups, each group including all the pixel signals from each corresponding fourth column.

9. An image processing system for controlling transfer of pixel signals between an image sensor and a memory storing said pixel signals in association with respective addresses, the image processing system comprising:
    an image sensor including a plurality of light sensing cells which are arranged in a two-dimensional array defined by a first direction and a second direction, each of the light sensing cells belonging to any of a plurality of groups and each group is arranged such that each light sensing cell of a group does not directly adjoin another light sensing cell of the same group in the first or second direction in the two-dimensional array, said image sensor outputs said pixel signals which are obtained in said plurality of light sensing cells, some of said pixel signals obtained in some of said plurality of light sensing cells which belong to one of said plurality of groups are sequentially output in a reverse order to an order in which said some of plurality of light sensing cells are arranged in said two-dimensional array with respect to at least one of said first direction and said second direction; and
    an image processor including,
        a transfer part which collects pixel signals from light sensing cells of the same group in sets for each of the plurality of groups, and which sequentially transfers said pixel signals which are collected in sets respectively for said plurality of groups and supplied from said plurality of light sensing cells in an order in which corresponding light sensing cells are arranged in either said first direction and said second direction of said two-dimensional array while manipulating said respective addresses, the transfer part including channel units which transfer pixel signals of the groups in parallel, a selector which sequentially selects pixel signals from each of the groups and outputs an output sequence of a plurality of said pixel signals according to an order in which corresponding light sensing cells are arranged in said image sensor, each of the plurality of said pixel signals in said output sequence are obtained from a different light sensing cell of the plurality of light sensing cells and said output sequence includes a pixel signal from each of the plurality of light sensing cells of the image sensor, and a color interpolator which color interpolates said output sequence of the plurality of said pixel signals.

10. The image processing system according to claim 9, wherein said transfer part includes a reading part which reads out said pixel signals from said memory.

11. The image processing system according to claim 10, wherein some of said plurality of light sensing cells which belong to a half of said plurality of groups are placed in one of two arbitrary horizontal lines laid adjacent to each other, and the others of said plurality of light sensing cells which belong to the other half of said plurality of groups are placed in the other of said two arbitrary horizontal lines, in said image sensor, said transfer part includes channel units, of which number is equal to a half of the number of said plurality of groups, two sets of pixel signals which are respectively caused by two groups are alternately transferred from one horizontal line to another horizontal line by each of said channel units.

12. The image processing system according to claim 10, wherein said reading part reads out said pixel signals from said memory according to an order in which corresponding light sensing cells are arranged in said image sensor.

13. The image processing system according to claim 9, wherein said transfer part includes a writing part which writes said pixel signals into said memory.

14. The image processing system according to claim 13, wherein said writing part writes said pixel signals into said memory according to an order in which corresponding light sensing cells are arranged in said image sensor.

15. The image processing system according to claim 9, wherein said first direction is a horizontal direction and said second direction is a vertical direction.

16. The image processor according to claim 9, wherein the two-dimensional array includes four groups, each group including all the pixel signals from each corresponding fourth column.

17. An image processor for controlling transfer of pixel signals between an image sensor and a memory storing said pixel signals in association with respective addresses, wherein said image sensor includes a plurality of light sensing cells each belonging to any of a plurality of groups, which are arranged in a two-dimensional array defined by a first direction and a second direction, said image sensor outputs said pixel signals which are obtained in said plurality of light sensing cells and are collected in plural sets respectively for said plurality of groups, some of said pixel signals obtained in some of said plurality of light sensing cells which belong to one of said plurality of groups are sequentially output in a reverse order to an order in which said some of plurality of light sensing cells are arranged in said two-dimensional array with respect to at least one of said first direction and said second direction, and said image processor comprises:

a transfer part which sequentially transfers said pixel signals which are collected in plural sets respectively for said plurality of groups and supplied from said plurality of light sensing cells in an order in which corresponding light sensing cells are arranged in either said first direction and said second direction of said two-dimensional array while manipulating said respective addresses; and a selector which sequentially selects and outputs said pixel signals according to a sequence of said plurality of groups in said two-dimensional array, wherein said transfer part includes a reading part that reads out said pixel signals from said memory, wherein some of said plurality of light sensing cells which belong to a half of said plurality of groups are placed in one of two arbitrary horizontal lines laid adjacent to each other, and the others of said plurality of light sensing cells which belong to the other half of said plurality of groups are placed in the other of said two arbitrary horizontal lines, in said image sensor, wherein said transfer part includes channel units, of which number is equal to a half of the number of said plurality of groups, and wherein two sets of pixel signals which are respectively caused by two groups are alternately transferred from one horizontal line to another horizontal line by each of said channel units.

18. The image processor according to claim 17, wherein said transfer part includes a writing part for writing said pixel signals into said memory.

* * * * *